US012654151B2

(12) United States Patent
Kimura et al.

(10) Patent No.: US 12,654,151 B2
(45) Date of Patent: Jun. 16, 2026

(54) METHOD FOR RECYCLING WATER ABSORBENT RESIN

(71) Applicant: NIPPON SHOKUBAI CO., LTD., Osaka (JP)

(72) Inventors: Kazuki Kimura, Himeji (JP); Nobuhiro Kobayashi, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 943 days.

(21) Appl. No.: 17/798,769

(22) PCT Filed: Feb. 12, 2021

(86) PCT No.: PCT/JP2021/005204
§ 371 (c)(1),
(2) Date: Aug. 10, 2022

(87) PCT Pub. No.: WO2021/162082
PCT Pub. Date: Aug. 19, 2021

(65) Prior Publication Data
US 2023/0147797 A1 May 11, 2023

(30) Foreign Application Priority Data

Feb. 14, 2020 (JP) ................................. 2020-023476
Feb. 14, 2020 (JP) ................................. 2020-023477

(51) Int. Cl.
B01J 20/34 (2006.01)
B01J 20/26 (2006.01)
(Continued)

(52) U.S. Cl.
CPC ......... B01J 20/3425 (2013.01); B01J 20/261 (2013.01); B01J 20/3475 (2013.01);
(Continued)

(58) Field of Classification Search
CPC .. B01J 20/3425; B01J 20/261; B01J 20/3475; B01J 20/3491; B09B 3/80; B09B 3/70;
(Continued)

(56) References Cited

U.S. PATENT DOCUMENTS

2015/0045461 A1    2/2015  Funamizu et al.
2020/0149220 A1*   5/2020  Konishi ................. D21H 11/14
(Continued)

FOREIGN PATENT DOCUMENTS

JP        2003326161 A  * 11/2003  ............. A61F 13/15
JP        2006-043495 A    2/2006
(Continued)

OTHER PUBLICATIONS

Written Opinion for PCT/JP2021/005204 dated Apr. 20, 2021.
International Search Report for PCT/JP2021/005204 dated Apr. 20, 2021.

*Primary Examiner* — Patricia L. Hailey
(74) *Attorney, Agent, or Firm* — Harness Dickey & Pierce P.L.C.

(57) ABSTRACT

Provided is a method for recycling a water-absorbing resin which contains absorbed liquid, with consideration for a resource aspect and an energy aspect. The method for recycling a water-absorbing resin which contains absorbed liquid includes: discharging the absorbed liquid from the water-absorbing resin which contains the absorbed liquid; and recovering a water-absorbing power of the water-absorbing resin.

7 Claims, 2 Drawing Sheets

(51) Int. Cl.

| | |
|---|---|
| *B09B 3/35* | (2022.01) |
| *B09B 3/70* | (2022.01) |
| *B09B 3/80* | (2022.01) |
| *B09B 101/95* | (2022.01) |
| *C08J 11/08* | (2006.01) |

(52) U.S. Cl.
CPC ............. *B01J 20/3491* (2013.01); *B09B 3/35* (2022.01); *B09B 3/70* (2022.01); *B09B 3/80* (2022.01); *C08J 11/08* (2013.01); *B09B 2101/95* (2022.01); *C08J 2333/02* (2013.01)

(58) Field of Classification Search
CPC ........ B09B 3/35; B09B 2101/95; C08J 11/08; C08J 2333/02
USPC ...... 502/25, 514; 604/358; 241/24.11, 24.29

See application file for complete search history.

(56) References Cited

U.S. PATENT DOCUMENTS

| | | | |
|---|---|---|---|
| 2020/0308764 A1 | 10/2020 | Konishi | |
| 2021/0039072 A1 | 2/2021 | Ito et al. | |

FOREIGN PATENT DOCUMENTS

| | | | | |
|---|---|---|---|---|
| JP | 2009073198 A | * | 4/2009 | ............. A61L 11/00 |
| JP | 4669123 B2 | * | 4/2011 | ............. B01J 20/26 |
| JP | 2013-132600 A | | 7/2013 | |
| JP | 2013-198862 A | | 10/2013 | |
| JP | 2017-128840 A | | 7/2017 | |
| JP | 2018-165423 A | | 10/2018 | |
| JP | 2019-076902 A | | 5/2019 | |
| JP | 2019-084470 A | | 6/2019 | |
| JP | 2019-108639 A | | 7/2019 | |
| JP | 2019-108640 A | | 7/2019 | |
| JP | 2019-135046 A | | 8/2019 | |
| WO | 2014/203922 A1 | | 12/2014 | |
| WO | WO-2019151538 A1 | * | 8/2019 | ............. B01J 20/28 |
| WO | 2020/105277 A1 | | 5/2020 | |

* cited by examiner

ORGANIC SOLVENT CONCENTRATION
AFTER IMMERSION STEP (MASS%)

SOLUBILITY WITH RESPECT TO WATER
(g/100 mL OF WATER AT 20℃)

Ca CHLORIDE

WATER-ABSORBING RESIN
WHICH HAS TAKEN IN
ABSORBED LIQUID

WATER-ABSORBING RESIN
FROM WHICH ABSORBED
LIQUID HAS BEEN
DISCHARGED

Na TRIPOLYPHOSPHATE

WATER-ABSORBING RESIN
FROM WHICH ABSORBED
LIQUID HAS BEEN
DISCHARGED

REGENERATED WATER-ABSORBING RESIN

COMPLEX

METHOD FOR RECYCLING WATER ABSORBENT RESIN

PRIORITY STATEMENT

This application is a national stage application under 35 U.S.C. § 371 of PCT International Application No. PCT/JP2021/005204, which has an international filing date of 12 Feb. 2021 and claims priority under 35 U.S.C. § 119 to Japanese Patent Application No. 2020-023476 filed on 14 Feb. 2020 and Japanese Patent Application No. 2020-023477 filed on 14 Feb. 2020. The contents of each application recited above are incorporated herein by reference in their entirety.

TECHNICAL FIELD

The present invention relates to a method for recycling a water-absorbing resin.

BACKGROUND ART

Water-absorbing resin (super absorbent polymer/SAP) is a water-swellable, water-insoluble polymer gelling agent, and is utilized in various absorbent, articles which include, for example, hygienic materials (sanitary materials) such as paper diapers, sanitary napkins, incontinence products for adults (incontinence pads), and sheets for pets, agricultural and horticultural water retaining agents for soil, and industrial waterproofing agents.

Among others, hygienic materials such as paper diapers and sanitary napkins are main applications of water-absorbing resins. These hygienic materials are disposed of and incinerated in large quantities as used absorbent articles after a short period (approximately 1 day at the longest) of use.

In recent years, attempts to recycle such used absorbent articles have been made from the viewpoint of environmental conservation and the like. For example, material recycling is being attempted. In the material recycling, raw materials are separated from used hygienic materials and reused. The raw materials which are contained in the hygienic materials include, for example, pulp, nonwoven fabric, and adhesive in addition to the aforementioned water-absorbing resin.

Patent Literature 1 discloses a method for recycling a water-absorbing resin, the method including the steps of: separating the water-absorbing resin from a used absorbent article; and subjecting, to washing and dehydration treatments, the water-absorbing resin which has been extracted.

Patent Literature 2 discloses a method for recycling a water-absorbing resin, the method including the steps of: treating, with an acid, the water-absorbing resin that has been derived from a used absorbent article; and then treating the water-absorbing resin with an alkali metal ion supply source.

Patent Literatures 3 to 6 each disclose a method for producing recycled pulp, the method including the steps of: treating a used absorbent article with an acid, a calcium salt, and the like; and separating pulp.

Patent Literature 7 discloses a method for producing recycled pulp, the method including the steps of: treating a used absorbent article with an acid; decomposing a water-absorbing resin by treatment with a chlorine dioxide generating material; and collecting the recycled pulp.

Patent Literature 8 discloses a method for producing recycled pulp, the method including the steps of: inactivating and decomposing a water-absorbing resin by treating a used absorbent article with a peracid; and collecting the recycled pulp.

Patent Literature 9 discloses a method for recycling a water-absorbing resin, the method including the steps of: treating, with a polyvalent metal salt, the water-absorbing resin which has taken in absorbed liquid; obtaining a dehydrated water-absorbing resin by forming a bond between the water-absorbing resin and the multivalent metal salt; and next, trying to recover a water-absorbing power of the dehydrated water-absorbing resin, by carrying out treatment with an alkali metal salt and breaking the bond.

CITATION LIST

Patent Literature

[Patent Literature 1]
Japanese Patent Application Publication Tokukai No. 2003-326161
[Patent Literature 2]
Japanese Patent Application Publication Tokukai No. 2019-135046
[Patent Literature 3]
Japanese Patent Application Publication Tokukai No. 2019-084470
[Patent Literature 4]
Japanese Patent Application Publication Tokukai No. 2017-128840
[Patent Literature 5]
Japanese Patent Application Publication Tokukai No. 2018-165423
[Patent Literature 6]
Japanese Patent Application Publication Tokukai No. 2019-076902
[Patent Literature 7]
Japanese Patent Application Publication Tokukai No. 2019-108639
[Patent Literature 8]
Japanese Patent Application Publication Tokukai No. 2019-108640
[Patent Literature 9]
Japanese Patent Application Publication Tokukai No. 2013-198862

SUMMARY OF INVENTION

Technical Problem

However, the above-described conventional recycling methods are not sufficient from the viewpoint of improvement of productivity, and there has been room for further improvement.

An embodiment of the present invention is attained in view of the above problems. A main object of an embodiment of the present invention is to provide a highly productive method for recycling a water-absorbing resin.

Further, from the viewpoint of effective utilization of resources and of earth environment and from the viewpoint of Sustainable Development Goals (SDG), another object of an embodiment of the present invention is to provide a method for recycling each member in a used absorbent article, in particular, a method for recycling a water-absorbing resin, with consideration for a resource aspect and an energy aspect.

Furthermore, another object of an embodiment of the present invention is to provide a highly productive method for recycling a water-absorbing resin capable of providing a regenerated water-absorbing resin that has a high dehydration rate and that is excellent in water-absorbing property.

Solution to Problem

An embodiment of the present invention relates to a method for recycling a water-absorbing resin derived from a used absorbent article, the method including: discharging absorbed liquid from the water-absorbing resin which contains the absorbed liquid; and recovering a water-absorbing power of the water-absorbing resin.

Advantageous Effects of Invention

An embodiment of the present invention can provide a highly productive method for recycling a water-absorbing resin.

Further, an embodiment of the present invention can provide a method for recycling each member in a used absorbent article, with consideration for a resource aspect and an energy aspect. In particular, an embodiment of the present invention makes it possible to collect each member from a used absorbent article without need to consume a large amount of resources and energy, and to regenerate a water-absorbing resin excellent in physical properties.

Furthermore, an embodiment of the present invention advantageously makes it possible to obtain, at a high productivity, a regenerated water-absorbing resin that has a high dehydration rate and that is excellent in water-absorbing property.

DESCRIPTION OF EMBODIMENTS

Figure 1:
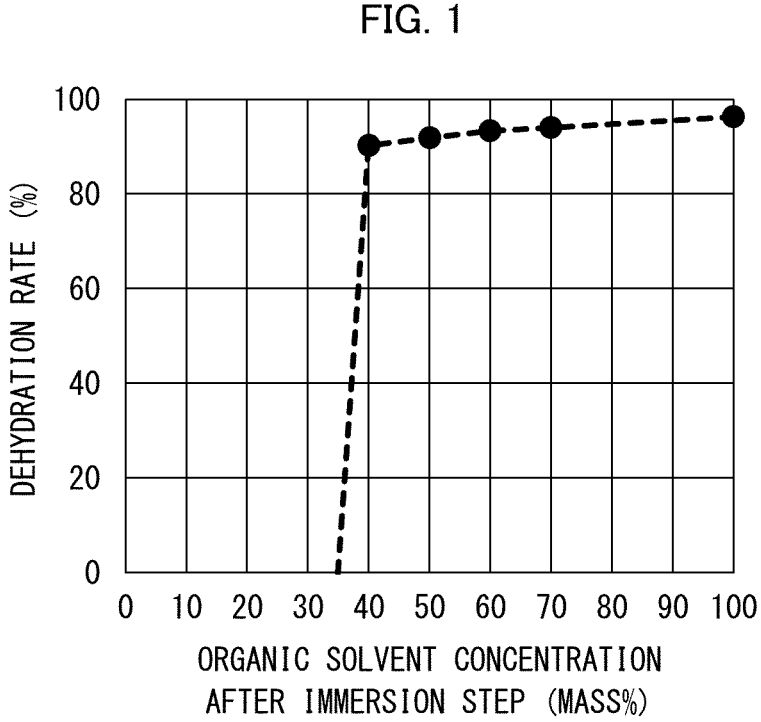
FIG. 1 is a graph showing a relation between a concentration of a hydrophilic organic solvent in an immersion after an immersion step and a dehydration rate of a water-absorbing resin in a recycling method in accordance with an aspect of the first embodiment.

The following description will discuss embodiments of the present invention in detail. Note however that the present invention is not limited to the embodiments below, but can be altered by a skilled person in the art within the scope of the claims. An embodiment derived from a proper combination of technical means each disclosed in a different embodiment is also encompassed in the technical scope of the present invention. In the present specification, numerical ranges expressed in the form of "A to B" mean "A or more and B or less", unless otherwise specifically noted. Further, " . . . acid (salt)" means " . . . acid and/or salt thereof", and "(meth)acrylic" means "acrylic and/or methacrylic."

Furthermore, the mass of a water-absorbing resin indicates a numerical value on the solid content basis unless otherwise noted.

First Embodiment

[1-1] Technical Idea of First Embodiment

Patent Literatures 1 and 2 each disclose a method for recycling a water-absorbing resin. In this recycling method, the water-absorbing resin needs to be extracted from a used absorbent article. However, it not only takes a lot of labor but also involves hygienic issues to extract a water-absorbing resin from a used absorbent article. Therefore, there is a demand for a method for recycling a water-absorbing resin capable of providing a regenerated water-absorbing resin by directly subjecting a used absorbent article to a dehydration treatment without need to extract in advance the water-absorbing resin contained in the used absorbent article.

Further, in order to isolate pulp, nonwoven fabric, etc. from a used absorbent article, it is necessary to use a large amount of water. However, in this case, the water-absorbing resin which has taken in absorbed liquid such as body fluid (for example, urine and blood) further swells with water and becomes a sticky swollen gel. Such a swollen gel has a problem in that separation and recovery of pulp, nonwoven fabric, adhesive, etc. is hindered.

In response to this problem, in a method for producing recycled pulp disclosed in each of Patent Literatures 3 to 8, a dehydration treatment is carried out in which absorbed liquid is discharged from the water-absorbing resin by subjecting, to a polyvalent metal salt treatment or an acid treatment, the water-absorbing resin which has taken in the absorbed liquid. These dehydration treatments inactivate the water-absorbing resin by forming a bond between the water-absorbing resin and a polyvalent metal salt or by converting a carboxyl group in the water-absorbing resin into an acid-form carboxyl group.

The water-absorbing resin which has been inactivated by the polyvalent metal salt treatment or the acid treatment has lost a water-absorbing power. Therefore, in order to reuse the water-absorbing resin which has been subjected to the above dehydration treatment, a reactivation treatment is essential. In the reactivation treatment, the water-absorbing power of the water-absorbing resin which has been inactivated is recovered by an alkali treatment or the like. Further, even if the reactivation treatment is carried out, it is not easy to recover the water-absorbing power to a level equivalent to that of the water-absorbing resin (hereinafter, referred to as "initial water-absorbing power") prior to taking in the absorbed liquid.

Moreover, the water-absorbing resin which has been subjected to the dehydration treatment and the reactivation treatment is reused as a regenerated water-absorbing resin in an absorbent article, after being subjected to a post-treatment such as a sterilization treatment and/or a disinfection treatment, and a drying treatment. However, the water-absorbing resin which is obtained after the reactivation treatment contains water in a large amount that is several 10 times to 1000 times as large as the amount of the water-absorbing resin, so that it takes enormous energy to dry the water-absorbing resin. Further, there is a problem in that thermal degradation and coloration of the water-absorbing resin occur due to drying.

For example, Patent Literatures 2 to 4 each propose a method for reusing a water-absorbing resin which has taken in absorbed liquid. However, the method includes complicated steps, and further leads to a significant deterioration in physical properties (in particular, water absorption performance) of the water-absorbing resin. Therefore, the regenerated water-absorbing resin which is obtained by these methods is inferior in terms of physical properties and cost to commercially available water-absorbing resins, that is, the water-absorbing resin (hereinafter, also referred to as "initial water-absorbing resin") prior to taking in liquid to be absorbed.

Further, in the method for producing recycled pulp disclosed in each of Patent Literatures 5 to 8, a gel-like aqueous water-soluble polymer solution, a decomposed solubilized product of the water-absorbing resin, and a shrunk insolubilized product of the water-absorbing resin are produced as by-products. These by-products require a lot of trouble and cost for processing and disposal after the recycled pulp are separated. Therefore, such a method is not preferable from the viewpoint of efficient utilization and recycling of resources from a used absorbent article.

As described above, in the above conventional methods for recycling each member in used absorbent articles, pulp, the water-absorbing resin, etc. are dispersed in a large amount of water, and then collected. Therefore, the conventional methods have problems such as a facility problem caused by a swollen gel which is made of the water-absorbing resin, and the necessity of a large amount of energy for a subsequent long-time drying treatment.

Further, the methods which are disclosed in Patent Literatures 2 to 8 require a lot of resources (acid, alkali, and polyvalent metal) and energy for recycling. In addition, the regenerated water-absorbing resin which is obtained by each of these methods is inferior to the initial water-absorbing resin, in terms of physical properties and cost.

In response to these problems, the inventors of the present invention have found that the above problems are solved by immersing a used absorbent article in an immersion liquid which contains a hydrophilic organic solvent. The inventors have consequently achieved the first embodiment of the present invention.

In the first embodiment of the present invention, it is possible to discharge absorbed liquid from the water-absorbing resin which has taken in an absorbed liquid, by an immersion step of immersing, in an immersion liquid which contains a hydrophilic organic solvent, a used absorbent article which contains the water-absorbing resin that has taken in the absorbed liquid, and as a result, the water-absorbing resin shrinks. This makes it possible to efficiently separate the water-absorbing resin from other members which are contained in the absorbent article. It is not necessary to separately provide the step of extracting only the water-absorbing resin by removing raw materials except for the water-absorbing resin, from the used absorbent article. In addition, in the immersion step, the water-absorbing resin which has taken in the absorbed liquid is treated without impairing the water-absorbing power of this water-absorbing resin. Therefore, the water-absorbing resin which is separated from the used absorbent article has an absorption capacity which has been already recovered. In other words, there is no need to separately provide the step of recovering the water-absorbing power after the immersion step. Thus, the first embodiment of the present invention has an advantage in that labor, time and cost required for recycling the water-absorbing resin is reduced and that productivity is improved, and also has an advantage in that it is possible to obtain a regenerated water-absorbing resin from which the absorbed liquid has been discharged and which has a recovered absorption capacity.

[1-2] Recycling Method in Accordance Aspect of First Embodiment

In an aspect of the first embodiment, a recycling method for a water-absorbing resin refers to a method for recycling a water-absorbing resin which is present inside a used absorbent article and which contains absorbed liquid, the method including an immersion step of dehydrating the water-absorbing resin by immersing the used absorbent article in an immersion liquid which contains a hydrophilic organic solvent.

(1-2-1) Absorbent Article

In the first embodiment, the term "absorbent article" refers to an article which is used in water absorption applications. More specifically, the term "absorbent article" refers to an absorbent article which includes an absorbent body that contains a water-absorbing resin and a fibrous material, a surface sheet which has liquid permeability, and a back sheet which has liquid impermeability. The aforementioned absorbent body is more suitably produced by blending the water-absorbing resin and the fibrous material with each other or sandwiching the water-absorbing resin between fibrous materials, and forming the water-absorbing resin and the fibrous materials into a film shape, a cylindrical shape, a sheet shape, or the like. Examples of the fibrous materials include hydrophilic fibers such as crushed wood pulp, cotton linter, crosslinked cellulosic fibers, rayon, cotton, wool, acetate, and vinylon.

In the recycling method in accordance with an aspect of the first embodiment, examples of the "used absorbent article" include, in particular, used hygienic materials which have absorbed body fluid (absorbed liquid) such as urine and blood, for example, hygienic materials (sanitary materials) such as paper diapers, sanitary napkins, incontinence products for adults (incontinence pads), and sheets for pets.

In a conventional method for recycling a water-absorbing resin, it has been necessary to include the step of extracting only the water-absorbing resin by removing raw materials such as a fibrous material, a surface sheet, and a back sheet except for the water-absorbing resin, from a used absorbent article prior to subjecting the absorbent resin to a dehydration treatment. In contrast, in the recycling method in accordance with an aspect of the first embodiment, it is not necessary to extract in advance the water-absorbing resin from the used absorbent article. In other words, it is not necessary to separately provide the step of extracting only the water-absorbing resin by removing raw materials except for the water-absorbing resin, from the used absorbent article. In the immersion step (described later), the water-absorbing resin in the absorbent article can be dehydrated and shrunk by directly subjecting the used absorbent article to an immersion treatment. Further, at the time point when the water-absorbing resin is separated, by the immersion step, from members which constitute the absorbent article, the water-absorbing resin has a water-absorbing power which has been recovered. In other words, it is possible to obtain a regenerated water-absorbing resin by the immersion step.

(1-2-2) Water-Absorbing Resin

In the first embodiment, the term "water-absorbing resin" refers to a water-swellable, water-insoluble polymer gelling agent. Although not particularly limited, the term "water-absorbing resin" refers to a conventional water-absorbing resin which has a fluid retention capacity of 10 times to 1000 times. Further, the phrases "water-absorbing resin which contains absorbed liquid" and "water-absorbing resin which has taken in absorbed liquid" in the first embodiment each refer to a swollen gel which is contained in a used absorbent article and which has taken in absorbed liquid such as body fluid. In the first embodiment, the water-absorbing resin which has actually absorbed human urine and swelled tends to be particularly easily dehydrated by the recycling method in accordance with an aspect of the first embodiment.

More specifically, it is preferable that the water-absorbing resin (hereinafter, also referred to as "initial water-absorbing resin") prior to taking in liquid to be absorbed satisfy a physical property that CRC, which is defined as a "water-swelling property" in ERT 441.2-02, is 5 g/g or more.

Note that the term "ERT" is an acronym for EDANA Recommended Test Methods, which are European standard (de facto international standard) measuring methods for water-absorbing resins. In the first embodiment, physical properties of the water-absorbing resin are measured in conformity with the ERT master copy (2002 revised version; known literature) unless otherwise specified.

The term "CRC" is an acronym for "centrifuge retention capacity", and refers to a fluid retention capacity without pressure (hereinafter, referred to also as "fluid retention capacity") of a water-absorbing resin. Specifically, the "CRC" refers to a fluid retention capacity (unit: g/g) that is obtained from 0.2 g of a water-absorbing resin which has been placed in a nonwoven fabric bag, then immersed in a large excess of a 0.90 mass % aqueous sodium chloride solution for 30 minutes so as to freely swell, and then drained in a centrifuge (250 G).

In the first embodiment, specific examples of the water-absorbing resin include a polyacrylic acid (salt)-based resin, a polysulfonic acid (salt)-based resin, a maleic anhydride (salt)-based resin, a polyacrylamide-based resin, a polyvinyl alcohol-based resin, a polyethylene oxide-based resin, a polyaspartic acid (salt)-based resin, a polyglutamic acid (salt)-based resin, a polyalginic acid (salt)-based resin, a starch-based resin, a cellulose-based resin, a (meth)acrylic acid salt crosslinked polymer, a saponified crosslinked (meth)acrylic acid ester-vinyl acetate copolymer, and a starch-acrylic acid salt graft polymer and a crosslinked substance thereof.

(1-2-3) Immersion Liquid

In the first embodiment, the immersion liquid in which the used absorbent article is to be immersed contains a hydrophilic organic solvent. As a result of immersion in the immersion liquid which contains a hydrophilic organic solvent, the water-absorbing resin which has taken in absorbed liquid and which is present in the absorbent article becomes non-swellable.

Since the water-absorbing resin is non-swellable, the absorbed liquid is stably discharged from the water-absorbing resin which has taken in the absorbed liquid. As a result, the water-absorbing resin is dehydrated and shrunk.

The concentration of the hydrophilic organic solvent in the immersion liquid is preferably 35 mass % or more, more preferably 40 mass % or more, and even more preferably 45 mass % or more. Particularly preferably, the concentration is 50 mass % or more, 60 mass % or more, 70 mass % or more, and 90% or more, and an immersion liquid made of only the hydrophilic organic solvent (100 mass %) is also suitable.

The hydrophilic organic solvent is an organic solvent which has a solubility of 20 g or more with respect to 100 mL of water at 20° C. The solubility with respect to 100 mL of water at 20° C. is preferably 25 g or more, more preferably 30 g or more, even more preferably 100 g or more, and particularly preferably 150 g or more.

Examples of such a hydrophilic organic solvent include (1) lower alcohols such as methanol, ethanol, n-propyl alcohol, isopropyl alcohol, and test-butyl alcohol, (2) ketones such as acetone, and methyl ethyl ketone, (3) ethers such as tetrahydro furan, and dioxane, and (4) esters such as methyl acetate, methyl lactate, and ethyl lactate. Among these hydrophilic organic solvents, hydrophilic organic solvents of (1) lower alcohols and (2) ketones are preferable.

The solubility of 20 g or more of the hydrophilic organic solvent with respect to 100 mL of water at 20° C. causes a dehydration reaction to proceed, and allows the water-absorbing resin obtained after the immersion step to have a dehydration rate of preferably 80% or more, more preferably 85% or more, and even more preferably 90% or more.

Throughout the immersion step (during the immersion step and/or at the end of the immersion step), the concentration of the hydrophilic organic solvent is controlled to be 35 mass % or more, so that it is possible to stably discharge the absorbed liquid from the water-absorbing resin which has taken in the absorbed liquid and to obtain a regenerated water-absorbing resin excellent in water-absorbing property.

The concentration of the hydrophilic organic solvent in the immersion liquid should be 35 mass % or more, and is preferably 40% mass % or more, and more preferably 45% mass % or more, during the immersion step and/or at the end of the immersion step.

In a case where the concentration of the hydrophilic organic solvent is 35 mass % or more throughout the immersion step, a dehydration reaction is caused to proceed, so that the water-absorbing resin obtained after the immersion step can have a dehydration rate of preferably 80% or more, more preferably 85% or more, and even more preferably 90% or more. In a case where the concentration of the hydrophilic organic solvent is less than 35 mass % throughout the immersion step, a dehydration effect of the immersion liquid is drastically decreased. Accordingly, the dehydration reaction of the water-absorbing resin does not proceed, and further, a water absorption reaction of the water-absorbing resin may proceed.

It should be noted that the term "dehydration rate of the water-absorbing resin at the end of the immersion step" is a numerical value which is calculated by the following expression (1) from the "CRC $(CRC_{r0})$ of the initial water-absorbing resin" and the "CRC $(CRC_{r1})$ of the water-absorbing resin at the end of the immersion step".

$$\text{Dehydration rate of water-absorbing resin at the end of the immersion step} = [1 - CRC_{r1}/CRC_{r0}] \times 100 \ [\%] \quad (1)$$

The above "CRC $(CRC_{r0})$ of the initial water-absorbing resin" refers to a fluid retention capacity which is measured according to the above-described method that is defined in ERT 441.2-02 for the initial water-absorbing resin. Further, the "CRC $(CRC_{r1})$ of the water-absorbing resin at the end of the immersion step" refers to a fluid retention capacity (unit: g/g) after draining, with use of a centrifuge (250 G), the water-absorbing resin which has been obtained after the immersion step and whose amount is equivalent to 0.2 g an the basis of the mass of the initial water-absorbing resin. The amount of the water-absorbing resin whose amount is equivalent to 0.2 g on the basis of the mass of the initial water-absorbing resin can be calculated as below by using the "solid content concentration of the water-absorbing resin at the end of the immersion step" which will be described later.

$$\text{Amount of water-absorbing resin equivalent to 0.2 g on the basis of mass of initial water-absorbing resin} = 0.2/(\text{solid content concentration of water-absorbing resin [mass \%] at the end of the immersion step}/100)$$

In addition to the dehydration rate, the "concentration of the solid content of the water-absorbing resin at the end of the immersion step" can be an indicator for evaluating a dehydration state in the immersion step. For a water-absorbing resin which has taken in absorbed liquid such as body fluid and which is contained in an actual used water absorbent article, it is preferable to evaluate the dehydration state by the solid content concentration of the water-absorbing resin at the end of the immersion step.

The above solid content concentration can be measured by a method in which, for example, the water-absorbing resin after the immersion step is dried in a drying device such as an oven and vaporization of water etc. is carried out. The "solid content concentration of the water-absorbing resin at the end of the immersion step" is preferably 8 mass % or more, more preferably 9 mass % or more, and even more preferably 10% mass %.

The higher the dehydration rate of the water-absorbing resin at the end of the immersion step is, that is, the higher the solid content concentration of the water-absorbing resin is, the easier it is to separate the water-absorbing resin from other members such as the fibrous material which is contained in the absorbent article. Moreover, it is possible to efficiently perform sterilization/disinfection against bacteria which are contained in an absorbed material such as urine, when the water-absorbing resin is subjected to a sterilization treatment and/or a disinfection treatment. In addition, it is possible to shorten the time for drying in a drying step, in which a recycled SAP is obtained by drying moisture which remains in the water-absorbing resin.

Note that, in the first embodiment, the "concentration of the hydrophilic organic solvent in the immersion liquid" during the immersion step or at the end of the immersion step is a value which is obtained by sampling a liquid from a mixture of the immersion liquid (liquid) and the used absorbent article (solid), and quantifying, for a sample liquid, the concentration of the hydrophilic organic solvent by using liquid chromatography, gas chromatography, or the like. Note that an approximate value of the concentration of the hydrophilic organic solvent in the immersion liquid can be obtained from a moisture content which is measured by using a Karl Fischer method or the like other than using liquid chromatography, gas chromatography, or the like.

In a preferred embodiment, the concentration of the hydrophilic organic solvent in the immersion liquid is measured during the immersion step and/or at the end of the immersion step. Then, the immersion liquid can be reused in the immersion step in a new batch without replacement until the concentration becomes less than 35 mass %. Further, in a here the concentration is less than 35 mass %, part of the immersion liquid is withdrawn and the hydrophilic organic solvent is added and replenished so that the concentration is 35 mass % or more. This makes it possible to reuse the immersion liquid in the immersion step in a new batch. Consequently, it is possible to efficiently carry out the dehydration treatment, so that the productivity can be further increased.

In a preferred embodiment, the concentration of the hydrophilic organic solvent in the immersion liquid is controlled so that a concentration of 35 mass % or more is maintained throughout the immersion step. This keeps a reaction rate of the dehydration reaction high until the end of the immersion step. Examples of a method for controlling the concentration of the hydrophilic organic solvent is not particularly limited, and include: a method according to which in a case where the concentration of the hydrophilic organic solvent in the sample liquid which has been sampled as appropriate during the immersion step falls below a predetermined value, part of the immersion liquid is withdrawn and the hydrophilic organic solvent is added and replenished; and a method according to which a high concentration of the immersion liquid is used at the start of the immersion step so that the concentration of the hydrophilic organic solvent in the immersion liquid becomes a predetermined value or more at the end of the immersion step.

The immersion liquid may be composed of only a hydrophilic organic solvent, or may be a mixture of the hydrophilic organic solvent and one or more kinds of liquid. Examples of the liquid to be mixed with the hydrophilic organic solvent include water and a hydrophobic organic solvent. It is preferable that the liquid to be mixed with the hydrophilic organic solvent is water since reuse of the immersion liquid and recovery of the hydrophilic organic solvent become easy.

(1-2-4) Immersion Conditions

In the first embodiment, at the start of the immersion step, the amount of the immersion liquid to be present with respect to the used absorbent article is, for example, preferably 1 part by mass or more and more preferably 2 parts by mass or more, with respect to, for example, 1 part by mass of the used absorbent article. Further, there is no particular limitation on an upper limit value of the amount of the immersion liquid, and the upper limit value is preferably 1000 parts by mass or less, and more preferably 100 parts by mass or less.

In a preferred embodiment, at the start of the immersion step, the amount of the immersion liquid to be present with respect to 1 g of the water-absorbing resin (on the solid content basis) is, for example, preferably 10 g or more, and more preferably 20 g or more. Further, the upper limit value of the amount of the immersion liquid is not particularly limited, and is preferably 10000 g or less and more preferably 1000 g or less with respect to 1 g of the water-absorbing resin.

The immersion liquid may be added and replenished during the process of the immersion step so that the concentration of the hydrophilic organic solvent in the immersion liquid is maintained at 35 mass % or more.

In a case where the amount of the immersion liquid is too small with respect to the used absorbent article at the start of the immersion step, the dehydration reaction does not occur sufficiently. On the other hand, in a case where the amount of the immersion liquid is too large with respect to the used absorbent article, the amount of the water-absorbing resin that can be processed per batch becomes small. This is not preferable in terms of productivity.

The immersion time from the start to the end of the immersion step can be set as appropriate in accordance with the degree of dehydration of the water-absorbing resin which has taken in the absorbed liquid. Note that the immersion time from the start to the end of the immersion step is intended to mean a time period from the time when the immersion liquid and the used absorbent article are brought into contact with each other so as to form a mixture of the immersion liquid and the used absorbent until the time when the immersion liquid is separated from the mixture by filtration or the like.

In order to increase the productivity, it is preferable that the immersion time be short. According to the recycling method in accordance with an aspect of the first embodiment, the immersion time could be set to 120 minutes or less, more preferably 90 minutes or less, and even more preferably 60 minutes or less. Further, in order to obtain a regenerated water-absorbing resin which has a high dehydration rate, the immersion time is preferably 5 minutes or longer, more preferably 10 minutes or longer, and even more preferably 15 minutes or longer.

It is possible to shorten the immersion time by maintaining the concentration of the hydrophilic organic solvent in the immersion liquid at 35 mass % or more throughout the immersion step. Further, the mixture of the immersion liquid and the used absorbent article may be stirred as appropriate. This makes it possible to increase a chance of contact between the water-absorbing resin and the immersion liquid and to increase a dehydration speed.

The immersion step may be carried out at any temperature at which the dehydration reaction of the water-absorbing resin can proceed. Specifically, the temperature of the mixture of the immersion liquid and the used absorbent article may be, for example, 5° C. to 50° C., preferably 10° C. to 40° C., and more preferably normal temperature (20° C. to 30° C.). In the recycling method in accordance with an aspect of the first embodiment, the dehydration reaction proceeds at a preferable reaction rate even at temperature or lower.

According to the recycling method in accordance with an aspect of the first embodiment, it is possible to obtain a regenerated water-absorbing resin which has a high dehydration rate of preferably 80% or more, more preferably 85% or more, and even more preferably more than 90%, for example, at normal temperature (20° C. to 30° C.) for a short time (5 minutes to 120 minutes).

(1-2-6) Water-Absorbing Power Recovery Rate

The recycling method in accordance with an aspect of the first embodiment is not a method in which the absorbed liquid is discharged by inactivation of the water-absorbing resin. Therefore, the regenerated water-absorbing resin which is obtained by the recycling method does not require a reactivation step of recovering the water-absorbing power, and can exhibit a high water-absorbing power. More specifically, according to the recycling method in accordance with an aspect of the first embodiment, the regenerated water-absorbing resin obtained after the immersion step can have a water-absorbing power recovery rate of preferably 90% or more, and more preferably to 95% or more.

Note that the "water-absorbing power recovery rate" of the "regenerated water-absorbing resin" is an index which indicates how much the water-absorbing power is recovered when the initial water-absorbing power is 100%, and is a numerical value which is calculated by the following expression (2) from the "CRC ($CRC_{r0}$) of the initial water-absorbing resin" and "CRC ($CRC_{r2}$) of the regenerated water-absorbing resin after drying".

$$\text{Water-absorbing power recovery rate of regenerated water-absorbing resin} = CRC_{r2}/CRC_{r0} \times 100[\%] \quad (2)$$

The "CRC ($CRC_{r2}$) of the regenerated water-absorbing resin after drying" is a fluid retention capacity which is measured according to the above-described method that is defined in ERT 441.2-02 after removing, by a drying treatment, remaining moisture from the water-absorbing resin that has been obtained after the immersion step.

(1-2-7) Crushing (Cutting) Step

In the first embodiment, the recycling method for the water-absorbing resin includes, in the immersion step or before the immersion step, a crushing (cutting) step of obtaining a crushed material (cut material) by crushing (cutting) the used absorbent article. The immersion step is a step from the start of immersion to the end of the immersion. The method may include the crushing step at the start of the immersion (that is, at the same time as the start of the immersion), or at any time during the immersion step. It is preferable to include the crushing step simultaneously with or prior to the immersion step.

The method of crushing (cutting) the used absorbent article is not particularly limited, and includes, for example, a method in which a cutting tool such as a cutter is used for cutting.

Carrying out the crushing (cutting) step makes it possible to increase the chance of contact between the water-absorbing resin in the absorbent article and the immersion liquid, and accordingly to increase the dehydration speed. Further, carrying out the crushing (cutting) step also makes it possible to easily separate respective members such as the water-absorbing resin, pulp, and nonwoven fabric from the used absorbent article.

(1-2-8) Separation Step

In the first embodiment, in the recycling method for the water-absorbing resin, it is possible to carry out a separation step in parallel with the immersion step and the crushing (cutting) step. The separation step is the step of separating the water-absorbing resin from the used absorbent article.

"Separating the water-absorbing resin from the used absorbent article" means taking out the water-absorbing resin which has shrunken by discharge of the absorbed liquid, through a gap in the pulp, the nonwoven fabric, and/or the like contained in the used absorbent article, and dispersing, in the immersion liquid, the water-absorbing resin thus taken out.

Examples of a method of separating the water-absorbing resin from the used absorbent article include a method in which the mixture of the immersion liquid and the used absorbent article is stirred.

The water-absorbing resin which has been dispersed in the immersion liquid can be collected by a conventional solid-liquid separation means for separating a soluble substance and an insoluble substance, such as filtration or centrifugation. The water-absorbing resin thus collected can be reused as the regenerated water-absorbing resin, after washed according to need and dried.

Further, pulp, nonwoven fabric, adhesive, and the like, which are members other than the water-absorbing resin, can also be collected by a conventional solid-liquid separation means, such as separation using a specific gravity difference, filtration separation, or centrifugation. The collected pulp, nonwoven fabric, adhesive, and the like thus collected can be reused as recycled pulp and recycled plastic after washed according to need and dried.

(1-2-9) Sterilization and Disinfection Step

In the aforementioned recycling method for the water-absorbing resin, it is possible to carry out a sterilization/disinfection step of sterilizing and/or disinfecting the water-absorbing resin, in parallel with the immersion step or after the immersion step.

Examples of a method of sterilizing and/or disinfecting the water-absorbing resin include a method in which the water-absorbing resin is treated with a disinfecting liquid. In a case where the sterilization/disinfection step is carried out in parallel with the immersion step, it is possible to introduce the disinfecting liquid into the mixture of the immersion liquid and the used absorbent article, and stir the mixture. Alternatively, in a case where the sterilization/disinfection step is carried out after the immersion step, the sterilization/disinfection step can be carried out by mixing and stirring the water-absorbing resin which has been obtained after the immersion step and the disinfecting liquid together in a container.

The disinfecting liquid is not particularly limited, and well-known disinfecting liquids can be used. Examples of such a disinfecting liquid include an aqueous sodium hypochlorite solution and an aqueous chlorine dioxide solution.

There is no particular limitation on a method of confirming a sterilization/disinfection level. However, it is possible to use, for example, an ATP test method, and it is preferable that the water-absorbing resin after the sterilization/disinfection step has an ATP value of 500 relative light unit (RLU) or less.

(1-10) Collection Step

The aforementioned recycling method for the water-absorbing resin may further include a collection step of collecting the hydrophilic organic solvent from the immersion liquid after the immersion step. It is advantageous in terms of cost and environmental aspects to collect the hydrophilic organic solvent from the immersion liquid and to reuse the hydrophilic organic solvent in the immersion step.

There is no particular limitation on a method of collecting the hydrophilic organic solvent from the immersion liquid, and well-known collection methods can be used. Examples of such a method include a method according to which the mixture of the immersion liquid and the used absorbent article is separated into the immersion liquid, the water-absorbing resin, and other solid material(s) and then the immersion liquid thus separated is distilled under normal pressure or under reduced pressure.

On the other hand, a residue which has been separated from the hydrophilic organic solvent in the collection step can be discharged into a river or the sea after the organic substance content of an aqueous solution is confirmed to have become an environmental standard value or less, by using a general organic substance-containing waste water treatment method if necessary.

[1-3] Method for Producing Regenerated Water-Absorbing Resin in Accordance with Aspect of First Embodiment The present invention further provides a method for producing a regenerated water-absorbing resin, the method including, as a step, the recycling method in accordance with an aspect of the first embodiment as described in [1-2] above.

Specifically, the method for producing a regenerated water-absorbing resin in accordance with an aspect of the first embodiment includes the immersion step of dehydrating a water-absorbing resin which has taken in absorbed liquid by immersing, in the immersion liquid, a used absorbent article which contains the water-absorbing resin.

A method for producing a regenerated water-absorbing resin in accordance with an aspect of the first embodiment includes the step of crushing (cutting) a used absorbent article simultaneously with or prior to the immersion step. Further, in the method for producing a regenerated water-absorbing resin in accordance with an aspect of the first embodiment, it is possible to carry out the separation step, in which the water-absorbing resin is separated from the used absorbent article, in parallel with the immersion step and the crushing (cutting) step. Furthermore, in the method for producing a regenerated water-absorbing resin in accordance with an aspect of the first embodiment, it is possible to carry out the sterilization/disinfection step of sterilizing and/or disinfecting the water-absorbing resin in parallel with the immersion step or after the immersion step. Furthermore, the method for producing a regenerated water-absorbing resin in accordance with an aspect of the first embodiment may further include the collection step of collecting the hydrophilic organic solvent from the immersion liquid after the immersion step.

The absorbent article, the immersion liquid, and the immersion conditions, which are used in the immersion step, and conditions and the like for each of the crushing (cutting) step, the separation step, the sterilization/disinfection step and the collection step are the same as those described in the above-described recycling method for the water-absorbing resin, and therefore, descriptions thereof will be omitted.

According to the method for producing a regenerated water-absorbing resin in accordance with an aspect of the first embodiment, it is possible to produce, at high productivity from the used absorbent article, the regenerated water-absorbing resin which has a high dehydration rate and which is excellent in water-absorbing property.

Second Embodiment

[2-1] Technical Idea of Second Embodiment

A regenerated water-absorbing resin which is obtained by a method that is disclosed in Patent Literature 9 has a lower water-absorbing power than a water-absorbing resin (hereinafter, referred to as "initial water-absorbing resin") prior to taking in liquid to be absorbed. The reason for this is considered as follows: since a bond between the water-absorbing resin and a polyvalent metal salt remains without being broken down even after treatment with an alkali metal salt, the water-absorbing power of the water-absorbing resin is not recovered. In order to recover the water-absorbing power of the regenerated water-absorbing resin to a level equivalent to that of the water-absorbing power (hereinafter, referred to as "initial water-absorbing power") of the initial water-absorbing resin, it is necessary to carry out further treatment for breaking down the bond which remains.

Further, the regenerated water-absorbing resin which is obtained by the recycling method that is disclosed in Patent Literature 2 has a low dehydration rate after inactivation and contains a large amount of the absorbed liquid that remains inside the regenerated water-absorbing resin. Therefore, there is a problem in that large amounts of labor, time and cost are required for a sterilization treatment and/or a disinfection treatment, and the productivity is lowered.

In response to these problems, the inventors of the present invention have found that the above problems are solved by bringing, into contact first with the polyvalent metal salt and then with a complex forming compound, the water-absorbing resin which has taken in the absorbed liquid. As a result, the inventors of the present invention have achieved the second embodiment of the present invention.

In a recycling method in accordance with an aspect of the second embodiment, it is possible to discharge the absorbed liquid at a high dehydration rate from the water-absorbing resin which has taken in the absorbed liquid, by a dehydration step in which the polyvalent metal salt is brought into contact with the water-absorbing resin that has taken in the absorbed liquid. Further, it is possible to recover the water-absorbing power of the water-absorbing resin at a high recovery rate by a regeneration step in which the water-absorbing resin from which the absorbed liquid has been discharged is brought into contact with the complex forming compound. Accordingly, the recycling method in accordance with an aspect of the second embodiment makes it possible to obtain a regenerated water-absorbing resin which has a high dehydration rate and which is excellent in water-absorbing property. Since the regenerated water-absorbing resin has a high dehydration rate, the sterilization treatment and/or the disinfection treatment can be efficiently carried out. Further, since the water-absorbing property is excellent, it is not necessary to separately provide a further step of recovering the water-absorbing power. Therefore, the recycling method in accordance with an aspect of the second embodiment advantageously improves productivity which is obtained as a result of reduction in labor, time and cost that are required for recycling the water-absorbing resin.

[2-2] Recycling Method in Accordance Aspect of Second Embodiment

In the second embodiment, the recycling method for the water-absorbing resin is a method for recycling a water-absorbing resin which has taken in absorbed and includes: a dehydration step of obtaining a water-absorbing resin (hereinafter, also referred to as "dehydrated water-absorbing resin") from which the absorbed liquid has been discharged, by bringing a polyvalent metal salt into contact with the water-absorbing resin; and a regeneration step of bringing, into contact with a complex forming compound, the water-absorbing resin from which the absorbed liquid has been discharged, the complex forming compound forming a complex with a metal contained in the polyvalent metal salt.

(2-2-1) Water-Absorbing Resin

In the second embodiment, the term "water-absorbing resin" refers to a water-swellable, water-insoluble polymer gelling agent. Although not particularly limited, the term "water-absorbing resin" refers to a conventional water-absorbing resin which has a fluid retention capacity of 10 times to 1000 times.

More specifically, it is preferable that the water-absorbing resin (hereinafter, also referred to as "initial water-absorbing resin") prior to taking in liquid to be absorbed satisfy a physical property that CRC, which is defined as a "water-swelling property" in NWSP 241.0. R2 (15), is 5 g/g or more.

Note that the "NIA/SP" is an acronym of "Non-Woven Standard Procedures-Edition 2015", and refers to evaluation methods of a nonwoven fabric and a product thereof. The evaluation methods each have been standardized and jointly issued in Europe and in the United States by the European Disposables and Nonwovens Associations (EDANA) and Association of the Nonwoven Fabrics Industry (INDA). The NWSP also shows a standard method for measuring water-absorbing resins. In the second embodiment, the physical properties of the water-absorbing resin are measured in conformity with the original NWSP (2015).

In the second embodiment, for the definition of "CRC", the definition of "CRC" described in the section "(1-2-2) Water-absorbing resin" of the first embodiment described above is referred to.

The water-absorbing resin used in the second embodiment contains an acid group(s). Examples of such an acid group include a carboxyl group, a sulfo group, and a phosphate group. The water-absorbing resin particularly preferably contains a carboxyl group since containing a carboxyl group makes it possible to easily obtain a high dehydration rate in the dehydration step which will be described later and also to easily obtain a high water-absorbing power recovery rate in the regeneration step.

The water-absorbing resin which contains an acid group is obtained by polymerizing an acid group-containing monomer. The content ratio of the acid group in the water-absorbing resin is not particularly limited. In order to exhibit a preferable water-absorbing property, constitutional units derived from acid group-containing monomers with respect to all constitutional units of the water-absorbing resin (100 mol %) is preferably from 30 mol % to 100 mol %, more preferably from 50 mol % to 100 mol %, even more preferably from 70 mol % to 100 mol %, and particularly preferably from 90 mol % to 100 mol %.

Further, some of the acid groups in the water-absorbing resin may be neutralized to form a salt. Examples of the salt include salts of alkali metals such as sodium, potassium, and lithium, ammonium salts, and amine salts.

A preferred specific example of the water-absorbing resin used in the second embodiment is the same as that of the water-absorbing resin described in the section "(1-2-2) Water-absorbing resin" of the first embodiment described above.

In the second embodiment, for the definition of "water-absorbing resin which has taken in absorbed liquid", the definition of "water-absorbing resin which has taken in absorbed liquid" described in the section "(1-2-2) Water-absorbing resin" of the first embodiment described above is referred to. In the second embodiment, the water-absorbing resin which has actually absorbed human urine and swelled tends to be particularly easily dehydrated by the recycling method in accordance with an aspect of the second embodiment.

Further, in the second embodiment, for the definitions of "absorbent article" and "used absorbent article", the definitions of "absorbent article" and "used absorbent article" described in the section "(1-2-1) Water absorbent article" of the first embodiment described above are referred to, respectively.

(2-2-2) Dehydration Step

In the second embodiment, the recycling method for the water-absorbing resin includes a dehydration step of obtaining a dehydrated water-absorbing resin by bringing the polyvalent metal salt into contact with the water-absorbing resin which has taken in the absorbed liquid.

The phrase "water-absorbing resin which has taken in the absorbed liquid" used in the dehydration step may be a water-absorbing resin which has been separated in advance by removing materials such as fibrous material, a surface sheet, and a back sheet, except for the water-absorbing resin, from the used absorbent article. Alternatively, the water-absorbing resin may be in an unseparated state in which the water-absorbing resin is contained in the used absorbent article or in a crushed material (cut material) thereof.

The term "polyvalent metal salt" refers to a salt of a metal which dissolves in water to produce a cation having a valency of two or more. Furthermore, the "polyvalent metal salt is brought into contact with the water-absorbing resin that has taken in the absorbed liquid" is intended to mean forming a mixture of the polyvalent metal salt and the water-absorbing resin by, for example, immersing the water-absorbing resin in an aqueous solution which contains the polyvalent metal salt, spraying or dropping, on the water-absorbing resin, an aqueous solution which contains the polyvalent metal salt, or contact mixing of the polyvalent metal salt in a solid or powder form with the water-absorbing resin.

Figure 3:
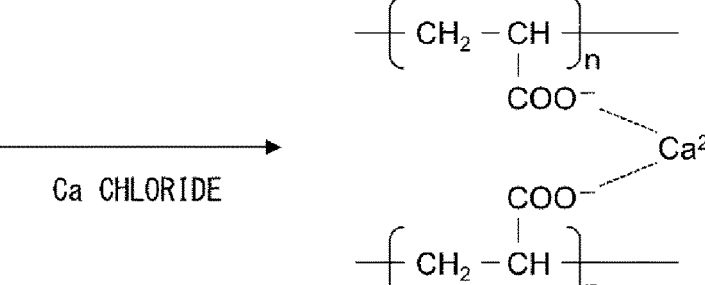
FIG. 3 is a diagram showing a reaction example in a dehydration step in a recycling method in accordance with an aspect of the second embodiment.

FIG. 3 is a diagram showing an example of a dehydration reaction in the dehydration step. As shown in FIG. 3, the water-absorbing resin typically dissociates a monovalent metal ion such as sodium, and oxygen of the acid group has a negative charge. The absorbed liquid is retained since water is attracted to oxygen which has this negative charge. When the polyvalent metal salt is brought into contact with this water-absorbing resin, the acid group in the water-absorbing resin is bonded to the cation having a valency of two or more, so that the water-absorbing resin loses the water-absorbing power. As a result, the absorbed liquid is discharged from the water-absorbing resin which has taken in the absorbed liquid, so that a dehydrated water-absorbing resin which has a high dehydration rate is obtained.

As a result of bringing the polyvalent metal salt into contact with the water-absorbing resin which has taken in the absorbed liquid, the dehydration rate of the dehydrated water-absorbing resin which is obtained after the dehydration step can be preferably 80% or more, more preferably 85% or more, and even more preferably 90% or more.

Note that the "dehydration rate of the dehydrated water-absorbing resin" is a numerical value which is calculated by the following expression (3) from the "CRC ($CRC_{r0}$) of the initial water-absorbing resin" and the "CRC ($CRC_{r1}$) of the dehydrated water-absorbing resin".

$$\text{Dehydration rate of dehydrated water-absorbing resin} = [1 - CRC_{r1}/CRC_{r0}] \times 100[\%] \qquad (3)$$

The "CRC ($CRC_{r0}$) of the initial water-absorbing resin" refers to a fluid retention capacity which is measured, for the initial water-absorbing resin, according to the above-described method that is defined in NWSP 241.0.R2 (15). Further, the "CRC ($CRC_{r1}$) of the dehydrated water-absorbing resin" refers to a fluid retention capacity (unit: g/g) after draining, with use of a centrifuge (250 G), the dehydrated water-absorbing resin which has been obtained after the dehydration step and whose amount is equivalent to 0.2 g on the basis of the mass of the initial water-absorbing resin.

At a higher dehydration rate of the water-absorbing resin, that is, at a lower moisture content of the water-absorbing resin, it is possible to more efficiently perform sterilization and/or disinfection against bacteria contained in the absorbed material such as urine when the sterilization treatment and/or the disinfection treatment of the dehydrated water-absorbing resin is carried out. Further, in a case where the water-absorbing resin which has taken in the absorbed liquid and which is in an unseparated state is used, the higher dehydration rate of the dehydrated water-absorbing resin makes it easier to separate the dehydrated water-absorbing resin from materials, such as the fibrous material, which are contained in the absorbent article.

Furthermore, examples of an index for evaluating the dehydration state other than the dehydration rate of the dehydrated water-absorbing resin include a solid content concentration of the dehydrated water-absorbing resin. The solid content concentration of the dehydrated water-absorbing resin can be measured by a method in which, for example, the dehydrated water-absorbing resin after the dehydration step is dried in a drying device such as an oven and vaporization of water etc. is carried out. The "solid content concentration of the dehydrated water-absorbing resin" is preferably 8 mass % or more, more preferably 9 mass % or more, and even more preferably 10 mass % or more.

Examples of the polyvalent metal salt include aluminum salts, zinc salts, alkaline earth metal salts, and transition metal salts. From among these polyvalent metal salts, one kind may be used alone or two or more kinds may be used in combination.

Examples of the alkaline earth metal salts include salts of metals such as beryllium, magnesium, calcium, strontium, and barium.

Examples of the transition metal salts include salts of metals such as iron, cobalt, nickel, and copper.

In a preferred embodiment, the polyvalent, metal salt is at least one selected from the group consisting of a calcium salt, a magnesium salt, and an aluminum salt.

Examples of the polyvalent metal salt which can be suitably used in the second embodiment include aluminum chloride, aluminum polychloride, aluminum sulfate, aluminum nitrate, aluminum potassium bis(sulfate), aluminum sodium bis(sulfate), potassium alum, ammonium alum, sodium alum, sodium aluminate, calcium chloride, calcium nitrate, magnesium chloride, magnesium sulfate, and magnesium nitrate.

In the dehydration step, the amount of the polyvalent metal salt in the mixture of the polyvalent metal salt and the water-absorbing resin is preferably 3 mmol or more, more preferably 4 mmol or more, and even more preferably 5 mmol or more, per gram of the mass of the water-absorbing resin. Further, the upper limit value of the amount of the polyvalent metal salt is not particularly limited, and is preferably 20 mmol or less and more preferably 15 mmol or less per gram of the mass of the water-absorbing resin.

In the dehydration step, in a case where the amount of the polyvalent metal salt is too small with respect to the water-absorbing resin, the dehydration reaction is not sufficiently carried out. On the other hand, in a case where the amount of the polyvalent metal salt is too large with respect to the water-absorbing resin, a large amount of the complex forming compound, which is to be added for recovery of the water-absorbing power, is also required. This is not preferable in terms of economical efficiency.

It is possible to set as appropriate a dehydration time from the start to the end of the dehydration step in accordance with the degree of dehydration of the water-absorbing resin which has taken in the absorbed liquid. Note that the dehydration time from the start to the end of the dehydration step is intended to mean a time period from the time when the mixture of the polyvalent metal salt and the water-absorbing resin is formed by bringing the polyvalent metal salt and the water-absorbing resin into contact with each other until the time when the soluble substance and the insoluble substance are separated by a conventional solid-liquid separation means.

In order to increase the productivity, it is preferable that the dehydration time be short. In the second embodiment, it is possible to set the dehydration time to 120 minutes or less, more preferably 90 minutes or less, and even more preferably 60 minutes or less. Further, in order to obtain the dehydrated water-absorbing resin which has a high dehydration rate, the dehydration time is preferably 5 minutes or longer, more preferably 10 minutes or longer, and even more preferably 15 minutes or longer.

The mixture of the polyvalent metal salt and the water-absorbing resin may be stirred as appropriate. This makes it possible to increase the dehydration speed by increasing a chance of contact between the polyvalent metal salt and the water-absorbing resin.

The dehydration step may be carried out at any temperature at which the dehydration reaction of the water-absorbing resin can proceed. Specifically, the temperature of the mixture of the polyvalent metal salt and the water-absorbing resin may be, for example, 5° C. to 80° C., preferably 10° C. to 60° C., and more preferably normal temperature (20° C. to 40° C.). In the recycling method in accordance with an aspect of the second embodiment, the dehydration reaction proceeds at a preferable reaction rate even at normal temperature or lower.

The dehydrated water-absorbing resin which has been obtained in the dehydration step is collected from an aqueous solution by a conventional solid-liquid separation means for separating a soluble substance and an insoluble substance, such as filtration or centrifugation, washed according to need, and used in the regeneration step which will be described later.

In a case where the dehydrated water-absorbing resin which has been obtained in the dehydration step is in an unseparated state in which the dehydrated water-absorbing resin contained in the used absorbent article or in a crushed material (cut material) thereof, the dehydrated water-absorbing resin may be separated by removing raw materials (pulp, nonwoven fabric, etc.) except for the dehydrated water-absorbing resin, from the used absorbent article prior to the regeneration step.

Examples of a method of separating the dehydrated water-absorbing resin from the used absorbent article include a method in which a mixture of an aqueous solution which contains a polyvalent metal salt and a used absorbent article or a crushed material (cut material) thereof is stirred and a dehydrated water-absorbing resin is dispersed in an aqueous solution. It is possible to carry out a crushing (cutting) process for further crushing (cutting) the used absorbent article or the crushed material (cut material) thereof, prior to a stirring process or in parallel with the stirring process. The dehydrated water-absorbing resin which is dispersed in the aqueous solution can be separated from the aqueous solution and other raw materials by filtration, centrifugation, or the like, and collected.

(2-2-3) Regeneration Step

In the second embodiment, the recycling method for the water-absorbing resin includes a regeneration step of bringing, into contact with a complex forming compound, the dehydrated water-absorbing resin which has been obtained in the dehydration step, the complex forming compound forming a complex with a metal that is contained in the polyvalent metal salt.

The dehydrated water-absorbing resin which is used in the regeneration step may be a dehydrated water-absorbing resin which has been separated in advance by removing materials except for the dehydrated water-absorbing resin, from the used absorbent article. Alternatively, the dehydrated water-absorbing resin may be in an unseparated state, and in the form of a mixture with the used absorbent article or with the crushed material (cut material) thereof.

The "complex forming compound forming a complex with a metal that is contained in the polyvalent metal salt" refers to a compound which has, in one molecule, a plurality of reactive functional groups each capable of being bonded to a metal that is contained in the polyvalent metal salt, and which thereby has an ability to form a complex with the metal. Examples of the reactive functional groups include a carboxyl group and a phosphate group. In a preferred embodiment, the complex forming compound has, in one molecule, preferably two or more carboxyl groups or phosphate groups, and more preferably three or more carboxyl groups or phosphate groups, for example, preferably 3 to 100 carboxyl groups or phosphate groups, more preferably 3 to 20 carboxyl groups or phosphate groups, and even more preferably 3 to 10 carboxyl groups or phosphate groups.

The phrase "bringing, into contact with a complex forming compound, the dehydrated water-absorbing resin" is intended to mean forming a mixture of the complex forming compound and the dehydrated water-absorbing resin by, for example, immersing the dehydrated water-absorbing resin in an aqueous solution which contains the complex forming compound, spraying or dropping, on the dehydrated water-absorbing resin, an aqueous solution which contains the complex forming compound, or contact mixing of the complex forming compound in a solid or powder form with the dehydrated water-absorbing resin.

Figure 4:
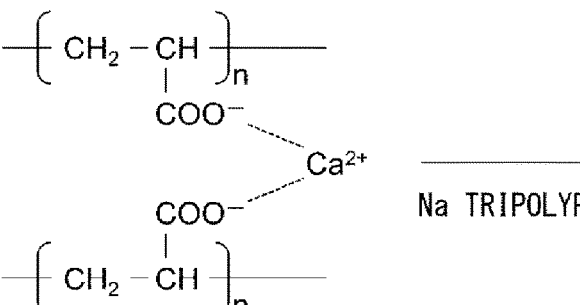
FIG. 4 is a diagram showing a reaction example in a regeneration step in the recycling method in accordance with an aspect of the second embodiment.

FIG. 4 is a diagram showing an example of a regeneration reaction in the regeneration step. As shown in FIG. 4, since the acid group in the dehydrated water-absorbing resin has formed a bond with a cation having a valency of two or more, the water-absorbing power of the dehydrated water-absorbing resin has been lost. This dehydrated water-absorbing resin is brought into contact with the complex forming compound (sodium tripolyphosphate in FIG. 4), so that the bond is cut and a stable complex that is composed of the polyvalent metal and the complex forming compound is formed. It is considered that the water-absorbing power is recovered since with such a reaction, a counter cation in the dehydrated water-absorbing resin is exchanged from a polyvalent metal ion to a monovalent metal ion.

When the complex forming compound is brought into contact with the dehydrated water-absorbing resin, the bond between the acid group and the polyvalent metal cation in the dehydrated water-absorbing resin can be cut. More specifically, according to the recycling method in accordance with an aspect of the second embodiment, the regenerated water-absorbing resin which is obtained after the regeneration step can have a water-absorbing power recovery rate of preferably 40% or more, and more preferably 50% or more, and further, can also have a water-absorbing power recovery rate of 60% or more, 70% or more, 80% or more, and 90% or more.

Note that the "water-absorbing power recovery rate" of the "regenerated water-absorbing resin" is an index which indicates how much the water-absorbing power is recovered when the initial water-absorbing power is 100%, and is a numerical value which is calculated by the following expression (4) from the "CRC ($CRC_{r0}$) of the initial water-absorbing resin" and the "CRC ($CRC_{r2}$) of the regenerated water-absorbing resin after drying".

$$\text{Water-absorbing power recovery rate of regenerated} \atop \text{water-absorbing resin} = CRC_{r2}/CRC_{r0} \times 100 [\%] \qquad (4)$$

The "CRC ($CRC_{r2}$) of the regenerated water-absorbing resin after drying" is a fluid retention capacity which is measured according to the above-described method that is defined in NWSP 241.0.R2 (15) for the regenerated water-absorbing resin from which remaining moisture has been removed by carrying out a drying treatment after the regeneration step.

Examples of the complex forming compound include a polyvalent carboxylic acid (salt), an amino polyvalent carboxylic acid (salt), a polyphosphoric acid (salt), and an organic phosphonic acid (salt). Among these complex forming compounds, an amino polyvalent carboxylic acid (salt) and a polyphosphoric acid (salt) are preferable. From among these complex forming compounds, one kind may be used alone or two or more kinds may be used in combination.

Examples of the polyvalent carboxylic acid (salt) include citric acid, tartaric acid, malic acid, succinic acid, and oxalic acid, and D isomers, L isomers, and meso isomers thereof, and salts thereof.

Examples of the amino polyvalent carboxylic acid (salt) include iminodiacetic acid, hydroxyethyl iminodiacetic acid, nitrilotriacetic acid, nitrilotripropionic acid, ethylenediaminetetraacetic acid, hydroxy ethylenediamine triacetic acid, hexamethylenediamine tetraacetic acid, diethylenetriamine pentaacetic acid, triethylenetetramine hexaacetic acid, trans-1,2-diaminocyclohexane tetraacetic acid, bis(2-hydroxyethyl)glycine, diaminopropanol tetraacetic acid, ethylenediamine-2-propionic acid, glycol ether diaminetetraacetic acid, bis(2-hydroxybenzyl)ethylenediamine diacetic acid, ethylenediamine disuccinic acid, L-glutamic acid-N,N-di-acetic acid, 3-hydroxy-2,2'-iminodisuccinic acid, glycol ether diaminetetraacetic acid, and methylglycine diacetic acid, and salts thereof.

Examples of the polyphosphoric acid (salt) include pyro-phosphoric acid, tripolyphosphoric acid, tetrapolyphos-phoric acid, and metaphosphoric acid, and salts thereof.

Examples of the organic phosphonic acid (salt) include 1-hydroxyethylidene-1,1-diphosphonic acid, aminotrimeth-ylenephosphonic acid, ethylenediaminetetra(methyleneph-osphonic acid), and diethylenetriaminepenta(methylene phosphonate). Examples of the organic phosphonic acid (salt) which is particularly preferably used include 1-hy-droxyethylidene-1,1-diphosphonic acid, ethylenediaminete-tra(methylenephosphonic acid), and diethylenetriaminepen-ta(methylene phosphonate).

In a case where the complex forming compound is a salt, it is possible use a monovalent salt, in particular, an alkali metal salt such as a sodium salt and a potassium salt, an ammonium salt, and an amine salt. Among others, a sodium salt and a potassium salt are particularly preferable.

In the regeneration step, the amount of the complex forming compound in the mixture of the complex forming compound and the dehydrated water-absorbing resin is preferably 2 mmol or more, more preferably 3 mmol or more, more preferably 5 mmol or more, more preferably 7 mmol or more, and particularly preferably 10 mmol or more per gram of the water-absorbing resin (on the solid content basis). Further, the upper limit value of the amount of the complex forming compound is not particularly limited, and is, for example, preferably 70 mmol or less, preferably 50 mmol or less, and more preferably 30 mmol or less per gram of the water-absorbing resin (on the solid content basis).

In the regeneration step, in a case where the amount of the complex forming compound is too small with respect to the dehydrated water-absorbing resin, the water-absorbing power is not sufficiently recovered. On the other hand, too large amount of the complex forming compound with respect to the dehydrated water-absorbing resin is not pref-erable in terms of economical efficiency.

In the regeneration step, the alkali metal salt may be used together with the complex forming compound. By using the complex forming compound and the alkali metal salt in combination, it is possible to further increase the water-absorbing power recovery rate of the regenerated water-absorbing resin. In addition, it is possible to reduce the amount of the complex forming compound which is neces-sary for achieving a desired water-absorbing power recovery rate.

Examples of the alkali metal salt include salts of alkali metals such as lithium, potassium, and sodium. From among these alkali metal salts, one kind may be used alone or two or more kinds may be used in combination. Particularly preferable examples of the alkali metal salt include sodium hydroxide, potassium hydroxide, sodium hydrogen carbon-ate, and sodium carbonate.

When the alkali metal salt is used together in the regen-eration step, the amount of the alkali metal salt used is preferably 2 mmol or more and more preferably 3 mmol or more per gram of the water-absorbing resin (on the solid content basis). Further, the upper limit value of the amount of the alkali metal salt is not particularly limited, and is, for example, preferably 70 mmol or less, preferably 50 mmol or less, and more preferably 30 mmol or less, per gram of the water-absorbing resin (on the solid content basis).

In the regeneration step, in a case where the amount of the alkali metal salt is too small with respect to the dehydrated water-absorbing resin, the effect of the alkali metal salt is not sufficiently exhibited. On the other hand, a too large amount of the alkali metal salt with respect to the dehydrated water-absorbing resin is not preferable in terms of economi-cal efficiency.

When an aqueous solution which contains the complex forming compound is used in the regeneration step, the amount of water used is preferably 10 g or more, and more preferably 20 g or more per gram of the water-absorbing resin (on the solid content basis). Further, the upper limit value of the amount of water used is not particularly limited, and is preferably 10000 g or less, and more preferably 1000 g or less, per gram of the water-absorbing resin (on the solid content basis).

The reaction time from the start to the end of the regen-eration step can be appropriately set according to the degree of the water-absorbing power recovery rate and the like. Note that the "reaction time from the start to the end of the regeneration step" means a time period from the time when the complex forming compound and the dehydrated water-absorbing resin are brought into contact with each other so as to form the mixture of the complex forming compound and the dehydrated water-absorbing resin until the time when the soluble substance and the insoluble substance are separated by a conventional solid-liquid separation means.

In order to increase the productivity, it is preferable that reaction time of the regeneration step be short. In the second embodiment, it is possible to set the reaction time to 120 minutes or less, more preferably 90 minutes or less, and even more preferably 60 minutes or less. Further, in order to obtain a regenerated water-absorbing resin which has a high water-absorbing power recovery rate, the reaction time is preferably 5 minutes or longer, more preferably 10 minutes or longer, and even more preferably 15 minutes or longer.

The mixture of the complex forming compound and the dehydrated water-absorbing resin may be stirred as appro-priate. This can increase a chance of contact between the complex forming compound and the dehydrated water-absorbing resin, so that the reaction rate can be increased.

The regeneration step may be carried out at any tempera-ture at which a reaction between the complex forming compound and the dehydrated water-absorbing resin can proceed. Specifically, the temperature of the mixture of the complex forming compound and the dehydrated water-absorbing resin may be, for example, 5° C. to 80° C., preferably 10° C. to 60° C., and more preferably 20° C. to 40° C. In the recycling method in accordance with an aspect of the second embodiment, the regeneration reaction pro-ceeds at a preferable reaction rate even at normal tempera-ture or lower.

The water-absorbing resin which has been obtained in the regeneration step can be collected from the aqueous solution by a conventional solid-liquid separation means for sepa-rating a soluble substance and an insoluble substance from each other, washed according to need, dried, and then reused as the regenerated water-absorbing resin.

(2-2-4) Sterilization/Disinfection Step

In the recycling method in accordance with an aspect of the second embodiment, it is possible to carry out a steril-ization/disinfection step of sterilizing and/or disinfecting the water-absorbing resin in parallel with the dehydration step and/or the regeneration step or after the dehydration step or the regeneration step.

Examples of a method of sterilizing and/or disinfecting the water-absorbing resin include a method in which the water-absorbing resin is treated with a disinfecting liquid. In a case where the sterilization/disinfection step is carried out in parallel with the dehydration step and/or the regeneration step, it is possible to carry out the sterilization/disinfection step by introducing the disinfecting liquid into the aqueous solution which contains the water-absorbing resin and stirring a resultant mixture. Alternatively, in a case where the sterilization/disinfection step is carried out after the dehydration step or the regeneration step, the sterilization/disinfection step can be carried out by mixing and stirring the water-absorbing resin and the disinfecting liquid together in a container.

In the second embodiment, it is possible to apply, to the "disinfecting liquid" and a "method of confirming a sterilization/disinfection level", respective descriptions of the "disinfecting liquid" and the "method of confirming a sterilization/disinfection level" in the section "(1-2-9) Sterilization/disinfection step" of the first embodiment described above.

(2-2-5) Collection of Polyvalent Metal Salt of Complex Forming Compound

The aqueous solution from which the water-absorbing resin that has been obtained in the regeneration step contains the polyvalent metal salt of the complex forming compound.

The recycling method in accordance with an aspect of the second embodiment may further include a collection step of collecting the polyvalent metal salt of the complex forming compound from the aqueous solution after the regeneration step. It is advantageous in terms of cost and environmental aspects to collect the polyvalent metal salt of the complex forming compound and to regenerate and reuse the reactive functional groups of the complex forming compound.

There is no particular limitation on a method of collecting and regenerating the polyvalent metal salt of the complex forming compound from the aqueous solution, and a well-known collection and regeneration method can be used. Examples of the well-known collection and regeneration method include a method of collecting and regenerating an organic acid disclosed in Japanese Patent Application Publication Tokukai No. 2019-85343.

The method of regenerating the reactive functional groups of the complex forming compound includes, for example, a method in which treatment is carried out with use of a strong acid, such as a sulfuric acid or a hydrochloric acid, whose amount is equimolar to that of the reactive functional groups. According to need, it is possible to further form a sodium salt of the complex forming compound by carrying out treatment with sodium hydroxide and neutralizing at least some of the reactive functional groups which have been regenerated.

[2-3] Method for Producing Regenerated Water-Absorbing Resin in Accordance with Aspect of Second Embodiment The present invention further provides a method for producing a regenerated water-absorbing resin, the method including, as a step, the recycling method in accordance with an aspect of the second embodiment as described in [2-2] above.

Specifically, the method for producing a regenerated water-absorbing resin in accordance with an aspect of the second embodiment of the present invention includes: a dehydration step of obtaining a dehydrated water-absorbing resin by bringing a polyvalent metal salt into contact with the water-absorbing resin which has taken in absorbed liquid; a regeneration step of bringing the dehydrated water-absorbing resin into contact with a complex forming compound which forms a complex with a metal that is contained in the polyvalent metal salt; a separation step of separating the regenerated water-absorbing resin and the complex forming compound from each other; and a drying step of drying the regenerated water-absorbing resin which has been separated in the separation step.

In the separation step of separating the regenerated water-absorbing resin and the complex forming compound from each other, it is possible to use a well-known solid-liquid separation means, for example, filtration separation, centrifugation, or the like. Meanwhile, in the drying step of drying the regenerated water-absorbing resin which has been separated in the separation step, it is possible to use a well-known drying means, such as drying by heating, hot air drying, drying under reduced pressure, fluidized-bed drying, infrared drying, microwave drying, drum dryer drying, drying azeotropic dehydration with a hydrophobic organic solvent, and high humidity drying with use of water vapor at a high temperature. Among these drying means, hot air drying is preferable from the viewpoint of drying efficiency. Note that the drying temperature (hot air temperature) in the hot air drying is preferably 100° C. to 250° C. and more preferably 120° C. to 200° C., from the viewpoint of a color tone of the water-absorbing resin and drying efficiency.

In the method for producing a regenerated water-absorbing resin in accordance with an aspect of the second embodiment, it is possible to carry out the sterilization/disinfection step of sterilizing and/or disinfecting the water-absorbing resin in parallel with the dehydration step and/or the regeneration step or after the dehydration step or the regeneration step. Further, the method for producing a regenerated water-absorbing resin in accordance with an aspect of the second embodiment may further include a collection step of collecting the polyvalent metal salt of the complex forming compound after the regeneration step.

Materials, conditions, etc. which are used in the method for producing the regenerated water-absorbing resin in accordance with an aspect of the second embodiment a identical to those described in the above-described recycling method in accordance with an aspect of the second embodiment. Therefore, descriptions of the materials, conditions, etc. are omitted.

According to the method for producing a regenerated water-absorbing resin in accordance with an aspect of the second embodiment, it is possible to produce, at high productivity, the regenerated water-absorbing resin which has a high dehydration rate and which is excellent in water-absorbing property.

The present invention encompasses the following inventions.

[1] A method for recycling a water-absorbing resin derived from a used absorbent article, the method comprising: discharging absorbed liquid from the water-absorbing resin which contains the absorbed liquid; and recovering a water-absorbing power of the water-absorbing resin.

[2] The method according to [1], for recycling the water-absorbing resin which contains the absorbed liquid and which is present inside the used absorbent article, the method comprising:

(i) an immersion step of immersing, in an immersion liquid which contains a hydrophilic organic solvent, the used absorbent article which contains the water-absorbing resin that has taken in the absorbed liquid;

(ii) a crushing step of crushing the used absorbent article into a crushed material in the immersion step or prior to the immersion step; and (iii) a separation step of separating the water-absorbing resin from a mixture of the immersion liquid and the crushed material.

[3] The method according to [2], wherein in the step (i), the immersion liquid contains 35 mass % or more of the hydrophilic organic solvent.

[4] The method according to [2] or [3], wherein in the step (iii), at least one member selected from pulp, nonwoven fabric, and adhesive is further separated and collected.

[5] The method according to any one of [2] to [4], wherein in the step (iii), the hydrophilic organic solvent is further separated and collected.

[6] The method according to any one of [2] to [5], wherein the water-absorbing resin after the step (i) has a dehydration rate of 80% or more.

[7] The method according to [6], wherein the water-absorbing resin after the step (i) has a water-absorbing power recovery rate of 90% or more

[8] The method according to any one of [2] to [7], wherein the water-absorbing resin after the step (i) has a solid content concentration of 8 mass % or more.

[9] The method according to [1], comprising: a dehydration step of obtaining a water-absorbing resin from which the absorbed liquid has been discharged, by bringing a polyvalent metal salt into contact with the water-absorbing resin which has taken in the absorbed liquid; and a regeneration step of recovering a water-absorbing power by bringing, into contact with a complex forming compound, the water-absorbing resin from which the absorbed liquid has been discharged, the complex forming compound forming a complex with a metal contained in the polyvalent metal salt.

[10] The method according to [9], wherein the water-absorbing resin which has taken in the absorbed liquid has an acid group.

[11] The method according to [9] or [10], wherein the polyvalent metal salt is at least one selected from the group consisting of a calcium salt, a magnesium salt, and an aluminum salt.

[12] The method according to any one of [9] to [11], wherein the water-absorbing resin from which the absorbed liquid has been discharged has a dehydration rate of 80% or more.

[13] The method according to [12], wherein the water-absorbing resin which has been regenerated in the regeneration step has a water-absorbing power recovery rate of 40% or more.

[14] The method according to any one of [9] to [13], wherein the water-absorbing resin from which the absorbed liquid has been discharged has a solid content concentration of 8 mass % or more.

[15] The method according to any one of [9] to [14], wherein the complex forming compound is at least one selected from the group consisting of a polyvalent carboxylic acid (salt), an amino polyvalent carboxylic acid (salt), a polyphosphoric acid (salt), and an organic phosphonic acid (salt).

[16] The method according to any one of [9] to [15], wherein in the regeneration step, the complex forming compound is used in a range of 2 mmol to 70 mmol per gram of the water-absorbing resin (on the solid content basis).

[17] The method according to any one of [9] to [16], wherein in the regeneration step, the complex forming compound is used together with an alkali metal salt.

[18] The method according to [17], wherein the alkali metal salt is used in a range of 2 mmol to 70 mmol per gram of the water-absorbing resin (on the solid content basis).

EXAMPLES

The following description will discuss the present invention more concretely with reference to Examples and Comparative Examples below. Note, however, that the present invention is not limited to the description thereof and that the present invention also encompasses in its scope any Example that is derived from a combination of technical means disclosed in different Examples.

Examples of First Embodiment

In each of Examples and Comparative Examples described below, in order to accurately measure the dehydration rate and the water-absorbing power recovery rate of a regenerated water-absorbing resin, W (g) (approximately 0.20 g) of an initial water-absorbing resin was placed in a nonwoven fabric bag (60 mm×85 mm, material according to EDANA ERT 441.1-99) and heat-sealing was performed, so that a sample was prepared and used as an absorbent article.

The CRC ($CRC_{r0}$) of the initial water-absorbing resin, the CRC ($CRC_{r1}$) of that water-absorbing resin at the end of the immersion step, and the CRC ($CRC_{r2}$) of a regenerated water-absorbing resin after drying were measured according to the following method.

(a) CRC ($CRC_{r0}$) of Initial Water-Absorbing Resin

W (g) (approximately 0.20 g) of the initial water-absorbing resin was evenly placed in a nonwoven fabric bag (60 mm×85 mm, material according to EDANA ERT 441.1-99), and heat-sealing was performed. Then, the nonwoven fabric bag was immersed in a large excess of a 0.90 mass % aqueous sodium chloride solution whose temperature was regulated at 25° C.±2° C.

After 30 minutes had elapsed, the nonwoven fabric bag was pulled up. Then, after 3 minutes of draining at 250 G ($250×9.81$ m/s$^2$) with use of a centrifuge (manufactured by Kokusan Co., Ltd., Model H-122 Small Centrifuge), the mass W2 (g) of the nonwoven fabric bag was measured.

Further, the same operation was carried out by using only the nonwoven fabric bag without use of the water-absorbing resin, and the mass W1 (g) of the nonwoven fabric bag at that time was measured. From the masses W1 and W2 thus obtained, the CRC ($CRC_{r0}$) (g/g) of the initial water-absorbing resin was calculated according to the following expression.

$$CRC_{r0} \text{ (g/g)}=\{(\text{mass } W2 \text{ (g)}-\text{mass } W1 \text{ (g)})/W \text{ (g)}\}-1.$$

(b) CRC ($CRC_{r1}$) of Water-Absorbing Resin at the End of Immersion Step

The nonwoven fabric bag which had been immersed in the 0.90 mass % aqueous sodium chloride solution for 30 minutes and drained for 3 minutes in the above (a) was immersed in an immersion liquid according to immersion conditions of each of the Examples and Comparative Examples, and stirring was carried out for 30 minutes. After the 30 minutes had elapsed, the nonwoven fabric bag was pulled up. Then, after 3 minutes of draining at 250 G ($250×9.81$ m/s$^2$ with use of a centrifuge, the mass W4 (g) of the nonwoven fabric bag was measured.

Further, the same operation was carried out by using only the nonwoven fabric bag without use of the water-absorbing resin, and the mass W3 (g) of the nonwoven fabric bag at that time was measured. From the masses W3 and W4 thus obtained, the CRC ($CRC_{r1}$) (g/g) of the water-absorbing resin at the end of the immersion step was calculated according to the following expression.

$$CRC_{r1} \text{ (g/g)}=\{(\text{mass } W4 \text{ (g)}-\text{mass } W3 \text{ (g)})/W \text{ (g)}\}-1.$$

(c) CRC ($CRC_{r2}$) of Regenerated Water-Absorbing Resin After Drying

The nonwoven fabric bag which had been immersed in the immersion liquid for 30 minutes and drained for 3 minutes with use of a centrifuge in the above (b) was dried in a hot air circulation oven at 70° C., so that remaining moisture was removed.

Next, the nonwoven fabric bag which had been obtained after drying was subjected to an operation as in the above (a), and the CRC ($CRC_{r2}$) (g/g) of the regenerated water-absorbing resin after drying was calculated.

(d) Solid Content Concentration of Water-Absorbing Resin After Immersion Step

In the above (b), the nonwoven fabric bag was immersed in the immersion liquid according to the immersion conditions of each of Examples and Comparative Examples, stirring was carried out for 30 minutes, and then, after a lapse of 30 minutes, the nonwoven fabric bag was pulled up and drained for 3 minutes with use of a centrifuge. Thereafter, W5 (g) of the water-absorbing resin was taken out from the nonwoven fabric bag. Then, after the water-absorbing resin was placed on an aluminum dish which had a mass W6 (g), and dried in a hot air circulation oven at 180° C. for 3 hours, the total mass W7 (g) of the water-absorbing resin and the aluminum dish was measured. According to the expression below, the solid content concentration of the water-absorbing resin after the immersion step was calculated.

$$\text{Solid content concentration of water-absorbing resin after immersion step (mass \%)} = \{\text{mass } W7 \text{ (g)} - \text{mass } W6 \text{ (g)}\}/W5 \text{ (g)} \times 100$$

Note that in a case where the solid content concentration after the dehydration step is to be measured for a water-absorbing resin which has taken in body fluid and the like and which has been taken out from an actual used water absorbent article, the above-described operation should be carried out for the "water-absorbing resin which has taken in body fluid and the like and which has been taken out from an actual used water absorbent article" in place of the "initial water-absorbing resin" in the above (a).

(e) Dryness of Water-Absorbing Resin After Immersion Step

In the above (b), the nonwoven fabric bag was immersed in the immersion liquid according to the immersion conditions of each of Examples and Comparative Examples, stirring was carried out for 30 minutes, and then, after a lapse of 30 minutes, the nonwoven fabric bag was pulled up and drained for 3 minutes with use of a centrifuge. Thereafter, the nonwoven fabric bag was dried in a hot air circulation oven at 70° C. for 1 hour, and then the dryness was determined by finger touch. Results of this determination were evaluated as follows.

Good: substantially no remaining moisture could be felt.
Poor: remaining water could be felt.

Production Example 1

A reaction liquid was prepared by dissolving 8.1 parts by mass of polyethylene glycol diacrylate (n=9) in 5500 parts by mass of a 38 mass % aqueous sodium acrylate solution (neutralization rate: 71 mol %) and degassing in a nitrogen gas atmosphere for 30 minutes.

As a polymerization vessel, a stainless steel double arm kneader with a jacket was prepared. The kneader includes two sigma-type blades and an openable lid that seals a system.

The reaction liquid was kept at 30° C., and introduced into the polymerization vessel. The system was replaced with nitrogen by blowing nitrogen gas into the system. Then, while the reaction liquid was stirred, 2.4 parts by mass of ammonium persulfate and 0.12 parts by mass of L-ascorbic acid were added as a polymerization initiator, so that polymerization was initiated after approximately 1 minute. The polymerization was caused to proceed at 20° C. to 95° C. Then, 60 min after initiation of the polymerization, a hydrogel polymer which had been grain refined and which had a diameter of approximately 5 mm was obtained.

The hydrogel polymer thus obtained was spread on a 50-mesh metal gauze, and hot air-dried at 150° C. for 100 minutes. Next, a resultant dried material was pulverized with use of a vibrating mill, and further classified with use of a sieve which had a mesh size of 850 µm and a sieve which had a mesh size of 106 µm. This gave a water-absorbing resin precursor (mass average particle diameter (D50) of 400 µm) which had passed through the sieve of a mesh size of 850 µm and remained on the sieve of a mesh size of 106 µm and which had been ground to have an uneven shape.

Then, 100 parts by mass of the water-absorbing resin precursor thus obtained was mixed with a surface-crosslinking agent composition liquid which is made up of 0.04 parts by mass of ethyleneglycoldiglycidyl ether, 0.9 parts by mass of propylene glycol and 3 parts by mass of water. A mixture thus obtained was subjected to a heating treatment at 210° C. for 40 minutes, so that a water-absorbing resin (1) was obtained. The water-absorbing resin (1) had a mass average particle diameter (D50) of 400 µm, and a water-soluble component amount (Ext) of 9%.

Note that the water-soluble component amount (Ext) means "Extractables" (water-soluble content) which is defined in ERT 470.2-02, and means a water-soluble component which is contained in the water-absorbing resin. The water-soluble component amount (Ext) means a value (unit: weight %) which was obtained by measuring the amount of a dissolved polymer by pH titration after 1.0 g of the water-absorbing resin had been added to 184.3 g of a 0.9 weight % aqueous sodium chloride solution and stirring had been carried out at 500 rpm for 16 hours.

Example 1-1

Two samples were prepared by placing 0.2 g of the water-absorbing resin (1) in a nonwoven fabric bag and performing heat-sealing, and were immersed in a large excess of a 0.90 mass % aqueous sodium chloride solution. After 30 minutes had elapsed, the samples were pulled up. Then, after 3 minutes of draining with use of a centrifuge (250 G), the CRC ($CRC_{r0}$) of the initial water-absorbing resin was measured. The $CRC_{r0}$ was 35.1 (g/g).

Then, the two samples Those $CRC_{r0}$ had been measured were each immersed in 80 g of acetone (which is miscible in all proportions with water) and stirring was carried out at 20° C. for 30 minutes. The water-absorbing resin was thus dehydrated. After the 30 minutes had elapsed, the samples were pulled up. Then, after 3 minutes of draining with use of a centrifuge (250 G), the CRC ($CRC_{r1}$) of the water-absorbing resin at the end of the immersion step was measured. The $CRC_{r1}$ was 1.3 (g/g). Meanwhile, the dehydration rate was 96.3%, and the concentration of acetone in the immersion liquid at the end of the immersion step was 92.2 mass %.

The water-absorbing resin was taken out from one of the samples whose $CRC_{r1}$ had been measured, and the solid content concentration of this water-absorbing resin was measured. The solid content concentration thus measured was 38.9 mass %.

Then, the other one of the samples whose $CRC_{r1}$ had been measured was dried in a hot air circulation oven at 70° C. for 1 hour, and the CRC ($CRC_{r2}$) of the regenerated water-absorbing resin after drying was measured. The $CRC_{r2}$ was 34.2 (g/g). Meanwhile, the water-absorbing power recovery rate was 97.4%. Table 1 shows the immersion liquid used, and Table 2 shows results.

Example 1-2

The CRC ($CRC_{r0}$) of the initial water-absorbing resin was measured as in Example 1-1. The $CRC_{r0}$ was 35.0 (g/g).

Then, two samples whose $CRC_{r0}$ had been measured were each immersed in 80 g of a mixture of acetone and water (acetone/water=70/30 (mass ratio)) and stirring was carried out at 20° C. for 30 minutes. The water-absorbing resin was thus dehydrated. After 30 minutes had elapsed, the samples were pulled up and the CRC ($CRC_{r1}$) of the water-absorbing resin at the end of the immersion step was measured as in Example 1-1. The $CRC_{r1}$ was 2.1 (g/g). Meanwhile, the dehydration rate was 94.0%, and the concentration of acetone in the immersion liquid at the end of the immersion step was 64.7 mass %.

Next, for the samples whose $CRC_{r1}$ had been measured, the solid content concentration of the water-absorbing resin after the immersion step and the CRC ($CRC_{r2}$) of the regenerated water-absorbing resin after drying were measured as in Example 1-1. The solid content concentration was 29.3 mass % and the $CRC_{r2}$ was 35.1 (g/g). Meanwhile, the water-absorbing power recovery rate was 100.3%. Table 1 shows the immersion liquid used, and Table 2 shows results.

Example 1-3

The CRC ($CRC_{r0}$) of the initial water-absorbing resin was measured as in Example 1-1. The $CRC_{r0}$ was 35.6 (g/g).

Then, two samples whose $CRC_{r0}$ had been measured were each immersed in 80 g of a mixture of acetone and water (acetone/water=60/40 (mass ratio)) and stirring was carried out at 20° C. for 30 minutes. The water-absorbing resin was thus dehydrated. After 30 minutes had elapsed, the samples were pulled up and the CRC ($CRC_{r1}$) of the water-absorbing resin at the end of the immersion step was measured as in Example 1-1. The $CRC_{r1}$ was 2.4 (g/g). Meanwhile, the dehydration rate was 93.3%, and the concentration of acetone in the immersion liquid at the end of the immersion step was 55.4 mass %.

Next, for the samples whose $CRC_{r1}$ had been measured, the solid content concentration of the water-absorbing resin after the immersion step and the CRC ($CRC_{r2}$) of the regenerated water-absorbing resin after drying were measured as in Example 1-1. The solid content concentration was 25.9 mass % and the $CRC_{r2}$ was 35.4 (g/g). Meanwhile, the water-absorbing power recovery rate was 99.4%. Table 1 shows the immersion liquid used, and Table 2 shows results.

Example 1-4

The CRC ($CRC_{r0}$) of the initial water-absorbing resin was measured as in Example 1-1. The $CRC_{r0}$ was 35.7 (g/g).

Then, two samples whose $CRC_{r0}$ had been measured were each immersed in 80 g of a mixture of acetone and water (acetone/water=50/50 (mass ratio)) and stirring was carried out at 20° C. for 30 minutes. The water-absorbing resin was thus dehydrated. After 30 minutes had elapsed, the samples were pulled up and the CRC ($CRC_{r1}$) of the water-absorbing resin at the end of the immersion step was measured as in Example 1-1. The $CRC_{r1}$ was 2.9 (g/g). Meanwhile, the dehydration rate was 91.9%, and the concentration of acetone in the immersion liquid at the end of the immersion step was 46.2 mass %.

Next, for the samples whose $CRC_{r1}$ had been measured, the solid content concentration of the water-absorbing resin after the immersion step and the CRC ($CRC_{r2}$) of the regenerated water-absorbing resin after drying were measured as in Example 1-1. The solid content concentration was 22.6 mass % and the $CRC_{r2}$ was 35.4 (g/g). Meanwhile, the water-absorbing power recovery rate was 99.2%. Table 1 shows the immersion liquid used, and Table 2 shows results.

Example 1-5

The CRC ($CRC_{r0}$) of the initial water-absorbing resin was measured as in Example 1-1. The $CRC_{r0}$ was 35.7 (g/g).

Then, two samples whose $CRC_{r0}$ had been measured were each immersed in 80 g of a mixture of acetone and water (acetone/water=40/60 (mass ratio)) and stirring was carried out at 20° C. for 30 minutes. The water-absorbing resin was thus dehydrated. After 30 minutes had elapsed, the samples were pulled up and the CRC ($CRC_{r1}$) of the water-absorbing resin at the end of the immersion step was measured as in Example 1-1. The $CRC_{r1}$ was 3.5 (g/g). Further, the dehydration rate was 90.2%, and the concentration of acetone in the immersion liquid at the end of the immersion step was 37.0 mass %.

Next, for the samples whose $CRC_{r1}$ had been measured, the solid content concentration of the water-absorbing resin after the immersion step and the CRC ($CRC_{r2}$) of the regenerated water-absorbing resin after drying were measured as in Example 1-1. The solid content concentration was 13.0 mass % and the $CRC_{r2}$ was 35.2 (g/g). Meanwhile, the water-absorbing power recovery rate was 98.6%0 Table 1 shows the immersion liquid used, and Table 2 shows results.

Example 1-6

The CRC ($CRC_{r0}$) of the initial water-absorbing resin was measured as in Example 1-1. The $CRC_{r0}$ was 35.4 (g/g).

Then, two samples whose $CRC_{r0}$ had been measured were each immersed in 80 g of isopropyl alcohol (which is miscible in all proportions with water) and stirring was carried out at 20° C. for 30 minutes. The water-absorbing resin was thus dehydrated. After 30 minutes had elapsed, the samples were pulled up and the CRC ($CRC_{r1}$) of the water-absorbing resin at the end of the immersion step was measured as in Example 1-1. The $CRC_{r1}$ was 1.3 (g/g). Meanwhile, the dehydration rate was 96.3%, and the concentration of isopropyl alcohol in the immersion liquid at the end of the immersion step was 92.1 mass %.

Next, for the samples whose $CRC_{r1}$ had been measured, the solid content concentration of the water-absorbing resin after the immersion step and the CRC ($CRC_{r2}$) of the regenerated water-absorbing resin after drying were measured as in Example 1-1. The solid content concentration was 39.1 mass % and the $CRC_{r2}$ was 34.9 (g/g). Meanwhile, the water-absorbing power recovery rate was 98.6%. Table 1 shows the immersion liquid used, and Table 2 shows results.

Example 1-7

The CRC ($CRC_{r0}$) of the initial water-absorbing resin was measured as in Example 1-1. The $CRC_{r0}$ was 35.2 (g/g).

Then, two samples whose $CRC_{r0}$ had been measured were each immersed in 80 g of a mixture of isopropyl alcohol and water (isopropyl alcohol/water=75/25 (mass ratio)) and stirring was carried out at 20° C. for 30 minutes. The water-absorbing resin was thus dehydrated. After 30 minutes had elapsed, the samples were pulled up and the CRC ($CRC_{r1}$) of the water-absorbing resin at the end of the immersion step was measured as in Example 1-1. The $CRC_{r1}$ was 2.3 (g/g). Meanwhile, the dehydration rate was 93.5%, and the concentration of isopropyl alcohol in the immersion liquid at the end of the immersion step was 69.3 mass %.

Next, for the samples whose $CRC_{r1}$ had been measured, the solid content concentration of the water-absorbing resin after the immersion step and the CRC ($CRC_{r2}$) of the regenerated water-absorbing resin after drying were measured as in Example 1-1. The solid content concentration was 96.9 mass % and the $CRC_{r2}$ was 35.2 (g/g) Meanwhile, the water-absorbing power recovery rate was 100.0%. Table 1 shows the immersion liquid used, and Table 2 shows results.

Example 1-8

The CRC ($CRC_{r0}$) of the initial water-absorbing resin was measured as in Example 1-1. The $CRC_{r0}$ was 35.2 (g/g).

Then, two samples whose $CRC_{r0}$ had been measured were each immersed in 80 g of a mixture of isopropyl alcohol and water (isopropyl alcohol/water=50/50 (mass ratio)) and stirring was carried out at 20° C. for 30 minutes. The water-absorbing resin was thus dehydrated. After 30 minutes had elapsed, the samples were pulled up and the CRC ($CRC_{r1}$) of the water-absorbing resin at the end of the immersion step was measured as in Example 1-1. The $CRC_{r1}$ was 3.1 (g/g). Meanwhile, the dehydration rate was 91.2%, and the concentration of isopropyl alcohol in the immersion liquid at the end of the immersion step was 46.3 mass %.

Next, for the samples whose $CRC_{r1}$ had been measured, the solid content concentration of the water-absorbing resin after the immersion step and the CRC ($CRC_{r2}$) of the regenerated water-absorbing resin after drying were measured as in Example 1-1. The solid content concentration was 20.5. mass % and the $CRC_{r2}$ was 35.9 (g/g). Meanwhile, the water-absorbing power recovery rate was 102.0%. Table 1 shows the immersion liquid used, and Table 2 shows results.

Example 1-9

The CRC ($CRC_{r0}$) of the initial water-absorbing resin was measured as in Example 1-1. The $CRC_{r0}$ was 35.9 (g/g).

Then, two samples whose $CRC_{r0}$ had been measured were each immersed in 80 g of ethanol (which is miscible in all proportions with water) and stirring was carried out at 20° C. for 30 minutes. The water-absorbing resin was thus dehydrated. After 30 minutes had elapsed, the samples were pulled up and the CRC ($CRC_{r1}$) of the water-absorbing resin at the end of the immersion step was measured as in Example 1-1. The $CRC_{r1}$ was 2.1 (g/g). Meanwhile, the dehydration rate was 94.2%, and the concentration of ethanol in the immersion liquid at the end of the immersion step was 91.2 mass %.

Next, for the samples whose $CRC_{r1}$ had been measured, the solid content concentration of the water-absorbing resin after the immersion step and the CRC ($CRC_{r2}$) of the regenerated water-absorbing resin after drying were measured as in Example 1-1. The solid content concentration was 30.3 mass % and the $CRC_{r2}$ was 35.8 (g/g). Meanwhile, the water-absorbing power recovery rate was 99.7%. Table 1 shows the immersion liquid used, and Table 2 shows results.

Example 1-10

The CRC ($CRC_{r0}$) of the initial water-absorbing resin was measured as in Example 1-1. The $CRC_{r0}$ was 36.1 (g/g).

Then, two samples whose $CRC_{r0}$ had been measured were each immersed in 80 g of a mixture of ethanol and water (ethanol/water=50/50 (mass ratio)) and stirring was carried out at 20° C. for 30 minutes. The water-absorbing resin was thus dehydrated. After 30 minutes had elapsed, the samples were pulled up and the CRC ($CRC_{r1}$) of the water-absorbing resin at the end of the immersion step was measured as in Example 1-1. The $CRC_{r1}$ was 2.5 (g/g). Meanwhile, the dehydration rate was 93.1%, and the concentration of ethanol in the immersion liquid at the end of the immersion step was 46.5 mass %.

Next, for the samples whose $CRC_{r1}$ had been measured, the solid content concentration of the water-absorbing resin after the immersion step and the CRC ($CRC_{r2}$) of the regenerated water-absorbing resin after drying were measured as in Example 1-1. The solid content concentration was 24.9 mass % and the $CRC_{r2}$ was 36.0 (g/g). Meanwhile, the water-absorbing power recovery rate was 99.7%. Table 1 shows the immersion liquid used, and Table 2 shows results.

Example 1-11

The CRC ($CRC_{r0}$) of the initial water-absorbing resin was measured as in Example 1-1. The $CRC_{r0}$ was 36.2 (g/g).

Then, two samples whose $CRC_{r0}$ had been measured were each immersed in 80 g of a mixture of ethanol and water (ethanol/water=40/60 (mass ratio)) and stirring was carried out at 20° C. for 30 minutes. The water-absorbing resin was thus dehydrated. After 30 minutes had elapsed, the samples were pulled up and the CRC ($CRC_{r1}$) of the water-absorbing resin at the end of the immersion step was measured as in Example 1-1. The $CRC_{r1}$ was 3.1 (g/g). Meanwhile, the dehydration rate was 91.4%, and the concentration of ethanol in the immersion liquid at the end of the immersion step was 36.9 mass %.

Next, for the samples whose $CRC_{r1}$ had been measured, the solid content concentration of the water-absorbing resin after the immersion step and the CRC ($CRC_{r2}$) of the regenerated water-absorbing resin after drying were measured as in Example 1-1. The solid content concentration was 20.1 mass % and the $CRC_{r2}$ was 35.8 (g/g). Meanwhile, the water-absorbing power recovery rate was 98.9%. Table 1 shows the immersion liquid used, and Table 2 shows results.

Example 1-12

The CRC ($CRC_{r0}$) of the initial water-absorbing resin was measured as in Example 1-1. The $CRC_{r0}$ was 35.0 (g/g).

Then, two samples whose $CRC_{r0}$ had been measured were each immersed in 80 g of ethyl lactate (solubility with respect to 100 mL of water at 20° C.: 100 g) and stirring was carried out at 20° C. for 30 minutes. The water-absorbing resin was thus dehydrated. After 30 minutes had elapsed, the samples were pulled up and the CRC ($CRC_{r1}$) of the water-absorbing resin at the end of the immersion step was measured as in Example 1-1. The $CRC_{r1}$ was 1.2 (g/g). Meanwhile, the dehydration rate was 96.7%, and the concentration of ethyl lactate in the immersion liquid at the end of the immersion step was 78.0% mass %.

Next, for the samples whose $CRC_{r1}$ had been measured, the solid content concentration of the water-absorbing resin after the immersion step and the CRC ($CRC_{r2}$) of the regenerated water-absorbing resin after drying were measured as in Example 1-1. The solid content concentration was 37.3 mass % and the $CRC_{r2}$ was 32.7 (g/g). Meanwhile, the water-absorbing power recovery rate was 93.3%. Table 1 shows the immersion liquid used, and Table 2 shows results.

Example 1-13

The CRC ($CRC_{r0}$) of the initial water-absorbing resin was measured as in Example 1-1. The $CRC_{r0}$ was 35.1 (g/g).

Then, two samples whose $CRC_{r0}$ had been measured were each immersed in 80 g of methyl acetate (solubility with respect to 100 mL of water at 20° C.: 24.4 g) and stirring was carried out at 20° C. for 30 minutes. The water-absorbing resin was thus dehydrated. After 30 minutes had elapsed, the samples were pulled up and the CRC ($CRC_{r1}$) of the water-absorbing resin at the end of the immersion step was measured as in Example 1-1. The $CRC_{r1}$ was 4.9 (g/g). Meanwhile, the dehydration rate was 86.1%, and the concentration of methyl acetate in the immersion liquid at the end of the immersion step was 79.9 mass %.

Next, for the samples whose $CRC_{r1}$ had been measured, the solid content concentration of the water-absorbing resin after the immersion step and the CRC ($CRC_{r2}$) of the regenerated water-absorbing resin after drying were measured as in Example 1-1. The solid content concentration was 13.8 mass % and the $CRC_{r2}$ was 35.8 (g/g). Meanwhile, the water-absorbing power recovery rate was 102.1%. Table 1 shows the immersion liquid used, and Table 2 shows results.

Comparative Example 1-1

The CRC ($CRC_{r0}$) of the initial water-absorbing resin was measured as in Example 1-1. The $CRC_{r0}$ was 35.7 (g/g).

Then, two samples whose $CRC_{r0}$ had been measured were each immersed in 80 g of a mixture of acetone and water (acetone/water=30/70 (mass ratio)) and stirring was carried out at 20° C. for 30 minutes. After the 30 minutes had elapsed, the samples were pulled up and the $CRC_{r1}$ was measured as in Example 1-1. The $CRC_{r1}$ was 67.6 (g/g). Although no dehydration reaction proceeded, the liquid absorption amount increased. Meanwhile, the concentration of acetone in the immersion liquid at the end of the immersion step was 32.6 mass %.

The water-absorbing resin was taken out from one of the samples whose $CRC_{r1}$ had been measured, and the solid content concentration of this water-absorbing resin was measured. The solid content concentration thus measured was 2.9 mass %.

Then, the other one of the samples whose $CRC_{r1}$ had been measured was dried in a hot air circulation oven at 70° C. for 1 hour as in Example 1-1. When the sample was collected after 1 hour had elapsed, a large amount of water remained in the sample. Accordingly, the sample was further dried in a reduced-pressure dryer for 12 hours, and the CRC ($CRC_{r2}$) of the regenerated water-absorbing resin after drying was measured. The $CRC_{r2}$ was 35.7 (g/g). Meanwhile, the water-absorbing power recovery rate was 100.0%. Table 1 shows the immersion liquid used, and Table 2 shows results.

Comparative Example 1-2

The CRC ($CRC_{r0}$) of the initial water-absorbing resin was measured as in Example 1-1. The $CRC_{r0}$ was 35.2 (g/g).

Then, two samples whose $CRC_{r0}$ had been measured were each immersed in 80 g of a mixture of acetone and water (acetone/water=20/80 (mass ratio)) and stirring was carried out at 20° C. for 30 minutes. After the 30 minutes had elapsed, the samples were pulled up and the $CRC_{r1}$ was measured as in Example 1-1. The $CRC_{r1}$ was 86.0 (g/g). Although no dehydration reaction proceeded, the liquid absorption amount increased. Meanwhile, the concentration of acetone in the immersion liquid at the end of the immersion step was 22.9 mass %.

The water-absorbing resin was taken out from one of the samples whose $CRC_{r1}$ had been measured, and the solid content concentration of this water-absorbing resin was measured. The solid content concentration thus measured was 2.8 mass %.

Then, the other one of the samples whose $CRC_{r1}$ had been measured was dried in a hot air circulation oven at 70° C. for 1 hour as in Example 1-1. When the sample was collected after 1 hour had elapsed, a large amount of water remained in the sample. Accordingly, the sample was further dried in a reduced-pressure dryer for 12 hours, and the CRC ($CRC_{r2}$) of the regenerated water-absorbing resin after drying was measured. The $CRC_{r2}$ was 35.1 (g/g). Meanwhile, the water-absorbing power recovery rate was 99.7%. Table 1 shows the immersion liquid used, and Table 2 shows results.

Comparative Example 1-3

The CRC ($CRC_{r0}$) of the initial water-absorbing resin was measured as in Example 1-1. The $CRC_{r0}$ was 34.8 (g/g).

Then, two samples whose $CRC_{r0}$ had been measured were each immersed in 80 g of a mixture of isopropyl alcohol and water (isopropyl alcohol/water=25/75 (mass ratio)) and stirring was carried out at 20° C. for 30 minutes. After the 30 minutes had elapsed, the samples were pulled up and the $CRC_{r1}$ was measured as in Example 1-1. The $CRC_{r1}$ was 71.7 (g/g). Although no dehydration reaction proceeded, the liquid absorption amount increased. Meanwhile, the concentration of isopropyl alcohol in the immersion liquid at the end of the immersion step was 27.5 mass %.

The water-absorbing resin was taken out from one of the samples whose $CRC_{r1}$ had been measured, and the solid content concentration of this water-absorbing resin was measured. The solid content concentration thus measured was 2.9 mass %.

Then, the other one of the samples whose $CRC_{r1}$ had been measured was dried in a hot air circulation oven at 70° C. for 1 hour as in Example 1-1. When the sample was collected after 1 hour had elapsed, a large amount of water remained in the sample. Accordingly, the sample was further dried in a reduced-pressure dryer for 12 hours, and the CRC ($CRC_{r2}$) of the regenerated water-absorbing resin after drying was measured. The $CRC_{r2}$ was 37.1 (g/g). Meanwhile, the water-absorbing power recovery rate was 106.6%. Table 1 shows the immersion liquid used, and Table 2 shows results.

Comparative Example 1-4

The CRC ($CRC_{r0}$) of the initial water-absorbing resin was measured as in Example 1-1. The $CRC_{r0}$ was 36.0 (g/g).

Then, two samples whose $CRC_{r0}$ had been measured were each immersed in 80 g of a mixture of ethanol and water (ethanol/water=30/70 (mass ratio)) and stirring was carried out at 20° C. for 30 minutes. After the 30 minutes had elapsed, the samples were pulled up and the $CRC_{r1}$ was measured as in Example 1-1. The $CRC_{r1}$ was 64.4 (g/g). Although no dehydration reaction proceeded, the liquid absorption amount increased. Meanwhile, the concentration of ethanol in the immersion liquid at the end of the immersion step was 32.3 mass %.

The water-absorbing resin was taken out from one of the samples whose $CRC_{r1}$ had been measured, and the solid content concentration of this water-absorbing resin was measured. The solid content concentration thus measured was 3.0 mass %.

Then, the other one of the samples whose $CRC_{r1}$ had been measured was dried in a hot air circulation oven at 70° C. for 1 hour as in Example 1-1. When the sample was collected after 1 hour had elapsed, a large amount of water remained in the sample. Accordingly, the sample was further dried in a reduced-pressure dryer for 12 hours, and the CRC ($CRC_{r2}$) of the regenerated water-absorbing resin after drying was measured. The $CRC_{r2}$ was 36.1 (g/g). Meanwhile, the water-absorbing power recovery rate was 100.3%. Table 1 shows the immersion liquid used, and Table 2 shows results.

Comparative Example 1-5

The CRC ($CRC_{r0}$) of the initial water-absorbing resin was measured as in Example 1-1. The $CRC_{r0}$ was 35.8 (g/g).

Then, two samples whose $CRC_{r0}$ had been measured were each immersed in 80 g of ethyl acetate (solubility with respect to 100 mL of water at 20° C.: 8.3 g) and stirring was carried out at 20° C. for 30 minutes. After the 30 minutes had elapsed, the samples were pulled up and the $CRC_{r1}$ was measured as in Example 1-1. The $CRC_{r1}$ was 22.2 (g/g). Meanwhile, the dehydration rate was 38.0%. Further, the concentration of ethyl acetate in the immersion liquid at the end of the immersion step was 92.5 mass %.

The water-absorbing resin was taken out from one of the samples whose $CRC_{r1}$ had been measured, and the solid content concentration of this water-absorbing resin was measured. The solid content concentration thus measured was 4.7 mass %.

Then, the other one of the samples whose $CRC_{r1}$ had been measured was dried in a hot air circulation oven at 70° C. for 1 hour as in Example 1-1. When the sample was collected after 1 hour had elapsed, a large amount of water remained in the sample. Accordingly, the sample was further dried in a reduced-pressure dryer for 12 hours, and the CRC ($CRC_{r2}$) of the regenerated water-absorbing resin after drying was measured. The $CRC_{r2}$ was 35.6 (g/g). Meanwhile, the water-absorbing power recovery rate was 99.4%. Table 1 shows the immersion liquid used, and Table 2 shows results.

Comparative Example 1-6

The CRC ($CRC_{r0}$) of the initial water-absorbing resin was measured as in Example 1-1. The $CRC_{r0}$ was 35.4 (g/g).

Then, two samples whose $CRC_{r0}$ had been measured were each immersed in 80 g of diethyl ether (solubility with respect to 100 mL of water at 20° C.: 6.9 g) and stirring was carried out at 20° C. for 30 minutes. After the 30 minutes had elapsed, the samples were pulled up and the $CRC_{r1}$ was measured as in Example 1-1. The $CRC_{r1}$ was 28.4 (g/g). Meanwhile, the dehydration rate was 19.6%. Further, the concentration of diethyl ether in the immersion liquid at the end of the immersion step was 94.5 mass %.

The water-absorbing resin was taken out from one of the samples whose $CRC_{r1}$ had been measured, and the solid content concentration of this water-absorbing resin was measured. The solid content concentration thus measured was 4.1 mass %.

Then, the other one of the samples whose $CRC_{r1}$ had been measured was dried in a hot air circulation oven at 70° C. for 1 hour as in Example 1-1. When the sample was collected after 1 hour had elapsed, a large amount of water remained in the sample. Accordingly, the sample was further dried in a reduced-pressure dryer for 12 hours, and the CRC ($CRC_{r2}$) of the regenerated water-absorbing resin after drying was measured. The $CRC_{r2}$ was 34.8 (g/g). Meanwhile, the water-absorbing power recovery rate was 98.4%. Table 1 shows the immersion liquid used, and Table 2 shows results.

TABLE 1

| | Immersion liquid | | |
| | Type | Water solubility (g/100 mL of water at 20° C.) | Organic solvent concentration after immersion step (mass %) |
| --- | --- | --- | --- |
| Example 1-1 | acetone | ∞ | 92.2 |
| Example 1-2 | acetone/water = 70/30 | ∞ | 64.7 |
| Example 1-3 | acetone/water = 60/40 | ∞ | 55.4 |
| Example 1-4 | acetone/water = 50/50 | ∞ | 46.2 |
| Example 1-5 | acetone/water = 40/60 | ∞ | 37.0 |
| Comparative Example 1-1 | acetone/water = 30/70 | ∞ | 32.6 |
| Comparative Example 1-2 | acetone/water = 20/80 | ∞ | 22.9 |
| Example 1-6 | IPA | ∞ | 92.1 |
| Example 1-7 | IPA/water = 75/25 | ∞ | 69.3 |
| Example 1-8 | IPA/water = 50/50 | ∞ | 46.3 |
| Comparative Example 1-3 | IPA/water = 25/75 | ∞ | 27.5 |
| Example 1-9 | ethanol | ∞ | 91.2 |
| Example 1-10 | ethanol/water = 50/50 | ∞ | 46.5 |
| Example 1-11 | ethanol/water = 40/60 | ∞ | 36.9 |
| Comparative Example 1-4 | ethanol/water = 30/70 | ∞ | 32.3 |
| Example 1-12 | ethyl lactate | 100 | 78.0 |
| Example 1-13 | methyl acetate | 24.4 | 79.9 |
| Comparative Example 1-5 | ethyl acetate | 8.3 | 92.5 |
| Comparative Example 1-6 | diethyl ether | 6.9 | 94.5 |

Note:

In Table 1, "IPA" is an abbreviation of isopropyl alcohol.

TABLE 2

| | CRC | | | After dehydration step | | After drying step |
| | | | | Dehydration rate | Solid content concentration | |
| | $CRC_{r0}$ | $CRC_{r1}$ | $CRC_{r2}$ | (%) | (mass %) | Dryness |
|---|---|---|---|---|---|---|
| Example 1-1 | 35.1 | 1.3 | 34.2 | 96.3 | 38.9 | good |
| Example 1-2 | 35.0 | 2.1 | 35.1 | 94.0 | 29.3 | good |
| Example 1-3 | 35.6 | 2.4 | 35.4 | 93.3 | 25.9 | good |
| Example 1-4 | 35.7 | 2.9 | 35.4 | 91.9 | 22.6 | good |
| Example 1-5 | 35.7 | 3.5 | 35.2 | 90.2 | 13.0 | good |
| Comparative Example 1-1 | 35.7 | 67.6 | 35.7 | <0 | 2.9 | poor |
| Comparative Example 1-2 | 35.2 | 86.0 | 35.1 | <0 | 2.8 | poor |
| Example 1-6 | 35.4 | 1.3 | 34.9 | 96.3 | 39.1 | good |
| Example 1-7 | 35.2 | 2.3 | 35.2 | 93.5 | 26.9 | good |
| Example 1-8 | 35.2 | 3.1 | 35.9 | 91.2 | 20.5 | good |
| Comparative Example 1-3 | 34.8 | 71.7 | 37.1 | <0 | 2.9 | poor |
| Example 1-9 | 35.9 | 2.1 | 35.8 | 94.2 | 30.3 | good |
| Example 1-10 | 36.1 | 2.5 | 36.0 | 93.1 | 24.9 | good |
| Example 1-11 | 36.2 | 3.1 | 35.8 | 91.4 | 20.1 | good |
| Comparative Example 1-4 | 36.0 | 64.4 | 36.1 | <0 | 3.0 | poor |
| Example 1-12 | 35.0 | 1.2 | 32.7 | 96.7 | 37.3 | good |
| Example 1-13 | 35.1 | 4.9 | 35.8 | 86.1 | 13.8 | good |
| Comparative Example 1-5 | 35.8 | 22.2 | 35.6 | 38.0 | 4.7 | poor |
| Comparative Example 1-6 | 35.4 | 28.4 | 34.8 | 19.6 | 4.1 | poor |

For the results of Examples 1-1 to 1-5 and Comparative Examples 1-1 and 1-2, FIG. 1 shows the relation between the concentration of the hydrophilic organic solvent (acetone) of the immersion liquid after the immersion step and the dehydration rate of the water-absorbing resin. As shown in FIG. 1, in a case where the concentration of the hydrophilic organic solvent was 35 mass % or more after the immersion step, a high dehydration rate of more than 90% could be achieved regardless of whether the concentration was high or low. On the other hand, in a case where the concentration of the hydrophilic organic solvent was less than 35 mass % after the immersion step, the dehydration rate drastically decreased. Meanwhile, the water-absorbing power recovery rate exhibited a high ratio of 95% or more regardless of the concentration of the hydrophilic organic solvent. It has been clarified from these results that the water-absorbing power of each of the water-absorbing resins exhibits substantially no decrease in the dehydration reaction of the water-absorbing resin caused by contact with the hydrophilic organic solvent. Further, similar results were obtained from a comparison between Examples 1-6 to 1-8 and Comparative Example 1-3, and from a comparison between Examples 1-9 to 1-11 and Comparative Example 1-4.

Figure 2:
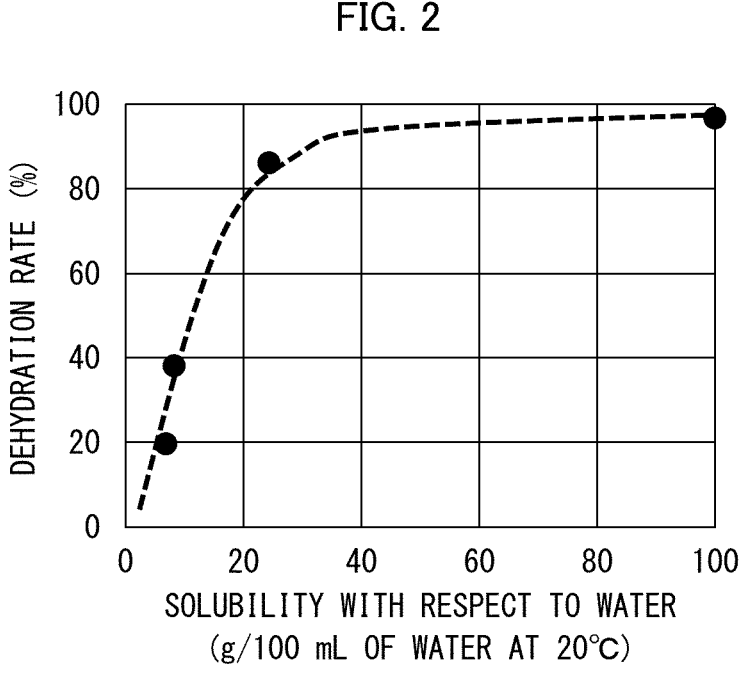
FIG. 2 is a graph showing a relation between a solubility of an organic solvent in the immersion liquid with respect to water and the dehydration rate of the water-absorbing resin in the recycling method in accordance with an aspect of the first embodiment.

Moreover, for the results of Examples 1-1, 1-6, 1-9, 1-12 and 1-13, and Comparative Examples 1-5 and 1-6, FIG. 2 shows the relation between the solubility of an organic solvent with respect to water and the dehydration rate of the water-absorbing resin. As shown in FIG. 2, in a case where the organic solvent had a solubility of 20 g or more with respect to 100 mL of water at 20° C., it was possible to achieve a high dehydration rate of 80% or more. On the other hand, in a case where the organic solvent had a solubility of less than 20 g with respect to 1.00 mL of water at 20° C., the dehydration rate drastically decreased.

Examples of Second Embodiment

In each of Examples and Comparative Examples of the second embodiment described below, W (g) (approximately 0.20 g) of an initial water-absorbing resin was placed in a nonwoven fabric bag (60 mm×85 mm) and heat-sealing was performed, so that a sample was obtained and used as a water-absorbing resin.

The CRC ($CRC_{r0}$) of the initial water-absorbing resin, the CRC ($CRC_{r1}$) of a dehydrated water-absorbing resin at the end of the immersion step, and the CRC ($CRC_{r2}$) of a regenerated water-absorbing resin after drying were measured according to the following method.

(a) CRC ($CRC_{r0}$) of Initial Water-Absorbing Resin

W (g) (approximately 0.20 g) of the initial water-absorbing resin was evenly placed in a nonwoven fabric bag (60 mm×85 mm), and heat-sealing was performed. Then, the initial water-absorbing resin was immersed in a large excess of a 0.90 mass % aqueous sodium chloride solution whose temperature was regulated at 25° C.±2° C.

After 30 minutes had elapsed, the nonwoven fabric bag was pulled up. Then, after 3 minutes of draining at 250 G (250×9.81 m/s²) with use of a centrifuge (manufactured by Kokusan Co., Ltd., Model H-122 Small Centrifuge), the mass W2 (g) of the nonwoven fabric bag was measured.

Further, the same operation was carried out by using only the nonwoven fabric bag without use of the water-absorbing resin, and the mass W1 (g) of the nonwoven fabric bag at that time was measured. From the masses W1 and W2 thus obtained, the CRC ($CRC_{r0}$) (g/g) of the initial water-absorbing resin was calculated according to the following expression.

$$CRC_{r0} \text{ (g/g)} = \{(\text{mass } W2 \text{ (g)} - \text{mass } W1 \text{ (g)})/W \text{ (g)}\} - 1.$$

(b) CRC ($CRC_{t1}$) of Dehydrated Water-Absorbing Resin

The nonwoven fabric bag which had been immersed in the 0.90 mass % aqueous sodium chloride solution for 30 minutes and drained for 3 minutes in the above (a) was immersed in an aqueous solution which contained a polyvalent metal salt and the like according to conditions of each of the Examples and Comparative Examples, and stirring was carried out for 30 minutes. After the 30 minutes had elapsed, the nonwoven fabric bag was pulled up. Then, after 3 minutes of draining at 250 G (250×9.81 m/s$^2$) with use of a centrifuge, the mass W4 (g) of the nonwoven fabric bag was measured.

Further, the same operation was carried out by using only the nonwoven fabric bag without use of the water-absorbing resin, and the mass W3 (g) of the nonwoven fabric bag at that time was measured. From the masses W3 and W4 thus obtained, CRC ($CRC_{t1}$) (g/g) of the dehydrated water-absorbing resin was calculated according to the following expression.

$$CRC_{t1} \text{ (g/g)} = \{(\text{mass } W4 \text{ (g)} - \text{mass } W3 \text{ (g)})/W \text{ (g)}\} - 1.$$

(c) CRC ($CRC_{t2}$) of Regenerated Water-Absorbing Resin After Drying

After having been immersed in the aqueous solution which contained a polyvalent metal salt or the like for 30 minutes and drained for 3 minutes in the above (b), the nonwoven fabric bag was immersed in an aqueous solution which contained a complex forming compound and the like according to conditions of each of the Examples and Comparative Examples, and stirring was carried out for 60 minutes. After the 60 minutes had elapsed, the nonwoven fabric bag was pulled up. Then, after 3 minutes of draining at 250 G (250×9.81 m/s$^2$) with use of a centrifuge, the nonwoven fabric bag was dried in a reduced-pressure dryer at 70° C., so that remaining moisture was removed.

Next, the nonwoven fabric bag which had been obtained after drying was subjected to an operation as in the above (a), and the CRC ($CRC_{t2}$) (g/g) of the regenerated water-absorbing resin after drying was calculated.

(d) Solid Content Concentration of Dehydrated Water-Absorbing Resin after Dehydration Step

After the nonwoven fabric bag had been immersed in the aqueous solution which contained a polyvalent metal salt and the like for 30 minutes and drained for 3 minutes in the above (b), W5 (g) of the dehydrated water-absorbing resin was taken out. Then, after the water-absorbing resin was placed on an aluminum dish which had a mass W6 (g), and dried in a hot air circulation oven at 180° C. for 3 hours, the total mass W7 (g) of the water-absorbing resin and the aluminum dish was measured. According to the expression below, the solid content concentration of the water-absorbing resin after the dehydration step was calculated.

$$\text{Solid content concentration of dehydrated water-absorbing resin after dehydration step} = \{\text{mass } W7 \text{ (g)} - \text{mass } W6 \text{ (g)}\}/W5 \text{ (g)} \times 100$$

Note that in a case where the solid content concentration after the dehydration step is to be measured for a water-absorbing resin which has taken in body fluid and the like and which has been taken out from an actual used absorbent article, the above-described operation should be carried out for the "water-absorbing resin which has taken in body fluid and the like and which has been taken out from an actual used absorbent article" in place of the "initial water-absorbing resin" in the above (a).

Production Example 2

A water-absorbing resin (2) was obtained in the same manner as the "water-absorbing resin (1)" (Production Example 1) which is described in Examples of the first embodiment described above. The water-absorbing resin (2) had a mass average particle diameter (D50) of 400 μm, and a water-soluble component amount (Ext) of 9%.

Note that the water-soluble component amount (Ext) means "Extractables" (water-soluble content) which is defined in NWSP 270.0.R2 (15), and means a water-soluble component which is contained in the water-absorbing resin. The water-soluble component amount (Ext) means a value (unit; weight %) which was obtained by measuring the amount of a dissolved polymer by pH titration after 1.0 g of the water-absorbing resin had been added to 184.3 g of a 0.9 weight % aqueous sodium chloride solution and stirring had been carried out at 500 rpm for 16 hours.

Example 2-1

Two samples were prepared by placing 0.2 g of the water-absorbing resin (2) in a nonwoven fabric bag and performing heat-sealing, and were immersed in a large excess of a 0.90 mass % aqueous sodium chloride solution. After 30 minutes had elapsed, the samples were pulled up. Then, after 3 minutes of draining with use of a centrifuge (250 G), the CRC ($CRC_{r0}$) of the initial water-absorbing resin was measured. The $CRC_{r0}$ was 34.8 (g/g).

Then, the two samples whose $CRC_{r0}$ had been measured were each immersed in an aqueous solution which had been obtained by dissolving 0.34 g (2.3 mmol) of calcium chloride dihydrate in 80 g of deionized water, and stirring was carried out at 20° C. for 30 minutes. The water-absorbing resin was thus dehydrated, and a dehydrated water-absorbing resin was obtained. After the 30 minutes had elapsed, the samples were pulled up. Then, after 3 minutes of draining with use of a centrifuge (250 G), the CRC ($CRC_{t1}$) of the dehydrated water-absorbing resin was measured. The $CRC_{t1}$ was 2.3 (g/g). Meanwhile, the dehydration rate was 93.4%.

The water-absorbing resin was taken out from one of the samples whose $CRC_{t1}$ had been measured, and the solid content concentration of the water-absorbing resin was measured. The solid content concentration thus measured was 24.2 mass %.

Then, the other one of the samples whose $CRC_{t1}$ had been measured was immersed in an aqueous solution which had been obtained by dissolving 0.59 g (203 mmol) of a citric acid trisodium salt in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{t2}$) of the regenerated water-absorbing resin after drying was measured. The $CRC_{t2}$ was 14.5 (g/g). Meanwhile, the water-absorbing power recovery rate was 41.7%.

Example 2-2

The CRC ($CRC_{r0}$) of the initial water-absorbing resin was measured as in Example 2-1. The $CRC_{r0}$ was 34.9 (g/g).

Then, two samples whose $CRC_{r0}$ had been measured were each dehydrated by carrying out treatment as in Example 2-1, so that a dehydrated water-absorbing resin was obtained. After 30 minutes had elapsed, the samples were pulled up and the CRC ($CRC_{t1}$) of the dehydrated water-absorbing resin was measured as in Example 2-1. The $CRC_{t1}$ was 2.3 (g/g). Meanwhile, the dehydration rate was 93.4%.

The water-absorbing resin was taken out from one of the samples whose $CRC_{t1}$ had been measured, and the solid content concentration of this water-absorbing resin was measured. The solid content concentration thus measured was 25.3 mass %.

Then, the other one of the samples whose $CRC_{r1}$ had been measured was immersed in an aqueous solution which had been obtained by dissolving 0.80 g (2.3 mmol) of a 3-hydroxy-2,2'-iminodisuccinic acid tetrasodium salt in 80 g of deionized water, and stirring was carried out at 20° C. for 60 minutes. After 60 minutes had elapsed, the sample was pulled up and dried in a reduced-pressure dryer at 70° C. for 24 hours. Then, the CRC ($CRC_{r2}$) of the regenerated water-absorbing resin after drying was measured. The $CRC_{r2}$ was 34.2 (g/g). Meanwhile, the water-absorbing power recovery rate was 98.0%.

Example 2-3

The CRC ($CRC_{r0}$) of the initial water-absorbing resin was measured as in Example 2-1. The $CRC_{r0}$ was 34.9 (g/g).

Then, two samples whose $CRC_{r0}$ had been measured were each dehydrated by carrying out a treatment as in Example 2-1, so that a dehydrated water-absorbing resin was obtained. After 30 minutes had elapsed, the samples were pulled up and the CRC ($CRC_{r1}$) of the dehydrated water-absorbing resin was measured as in Example 2-1. The $CRC_{r1}$ was 2.4 (g/g). Meanwhile, the dehydration rate was 93.2%.

The water-absorbing resin was taken out from one of the samples whose $CRC_{r1}$ had been measured, and the solid content concentration of this water-absorbing resin was measured. The solid content concentration thus measured was 23.5 mass %.

Then, the other one of the samples whose $CRC_{r1}$ had been measured was immersed in an aqueous solution which had been obtained by dissolving 0.61 g (2.3 mmol) of sodium pyrophosphate in 80 g of deionized water, and stirring was carried out at 20° C. for 60 minutes. After 60 minutes had elapsed, the sample was pulled up and dried in a reduced-pressure dryer at 70° C. for 24 hours. Then, the CRC ($CRC_{r2}$) of the regenerated water-absorbing resin after drying was measured. The $CRC_{r2}$ was 30.0 (g/g). Meanwhile, the water-absorbing power recovery rate was 85.8%.

Example 2-4

The CRC ($CRC_{r0}$) of the initial water-absorbing resin was measured as in Example 2-1. The $CRC_{r0}$ was 34.8 (g/g).

Then, two samples whose $CRC_{r0}$ had been measured were each dehydrated by carrying out a treatment as in Example 2-1, so that a dehydrated water-absorbing resin was obtained. After 30 minutes had elapsed, the samples were pulled up and the CRC ($CRC_{r1}$) of the dehydrated water-absorbing resin was measured as in Example 2-1. The $CRC_{r1}$ was 2.2 (g/g). Meanwhile, the dehydration rate was 93.7%.

The water-absorbing resin was taken out from one of the samples whose $CRC_{r1}$ had been measured, and the solid content concentration of this water-absorbing resin was measured. The solid content concentration thus measured was 25.6 mass %.

Then, the other one of the samples whose $CRC_{r1}$ had been measured was immersed in an aqueous solution which had been obtained by dissolving 2.1 g (4.6 mmol) of a diethylenetriamine pentaacetic acid trisodium salt in 80 g of deionized water, and stirring was carried out at 20° C. for 60 minutes. After 60 minutes had elapsed, the sample was pulled up and dried in a reduced-pressure dryer at 70° C. for 24 hours. Then, the CRC ($CRC_{r2}$) of the regenerated craterabsorbing resin after drying was measured. The $CRC_{r2}$ was 31.6 (g/g). Meanwhile, the water-absorbing power recovery rate was 90.8%.

Example 2-5

The CRC ($CRC_{r0}$) of the initial water-absorbing resin was measured as in Example 2-1. The $CRC_{r0}$ was 34.4 (g/g).

Then, two samples whose $CRC_{r0}$ had been measured were each dehydrated by carrying out a treatment as in Example 2-1, so that a dehydrated water-absorbing resin was obtained. After 30 minutes had elapsed, the samples were pulled up and the CRC ($CRC_{r1}$) of the dehydrated water-absorbing resin was measured as in Example 2-1. The $CRC_{r1}$ was 2.6 (g/g). Meanwhile, the dehydration rate was 92.5%.

The water-absorbing resin was taken out from one of the samples whose $CRC_{r1}$ had been measured, and the solid content concentration of this water-absorbing resin was measured. The solid content concentration thus measured was 21.9 mass %.

Then, the other one of the samples whose $CRC_{r1}$ had been measured was immersed in an aqueous solution which had been obtained by dissolving 0.89 g (4.6 mmol) of an iminodiacetic acid sodium salt monohydarate in 80 g of deionized water, and stirring was carried out at 20° C. for 60 minutes. After 60 minutes had elapsed, the sample was pulled up and dried in a reduced-pressure dryer at 70° C. for 24 hours. Then, the CRC ($CRC_{r2}$) of the regenerated water-absorbing resin after drying was measured. The $CRC_{r2}$ was 26.1 (g/g). Meanwhile, the water-absorbing power recovery rate was 76.0%.

Example 2-6

The CRC ($CRC_{r0}$) of the initial water-absorbing resin was measured as in Example 2-1. The $CRC_{r0}$ was 33.8 (g/g).

Then, two samples whose $CRC_{r0}$ had been measured were each dehydrated by carrying out a treatment as in Example 2-1, so that a dehydrated water-absorbing resin was obtained. After 30 minutes had elapsed, the samples were pulled up and the CRC ($CRC_{r1}$) of the dehydrated water-absorbing resin was measured as in Example 2-1. The $CRC_{r1}$ was 2.3 (g/g). Meanwhile, the dehydration rate was 93.2%.

The water-absorbing resin was taken out from one of the samples whose $CRC_{r1}$ had been measured, and the solid content concentration of this water-absorbing resin was measured. The solid content concentration thus measured was 24.2 mass %.

Then, the other one of the samples whose $CRC_{r1}$ had been measured was immersed in an aqueous solution which had been obtained by dissolving 0.84 g (2.3 mmol) of sodium tripolyphosphate in 80 g of deionized water, and stirring was carried out at 20° C. for 60 minutes. After 60 minutes had elapsed, the sample was pulled up and dried in a reduced-pressure dryer at 70° C. for 24 hours. Then, the CRC ($CRC_{r2}$) of the regenerated water-absorbing resin after drying was measured. The $CRC_{r2}$ was 33.6 (g/g). Meanwhile, the water-absorbing power recovery rate was 99.4%.

Example 2-7

The CRC ($CRC_{r0}$) of the initial water-absorbing resin was measured as in Example 2-1. The $CRC_{r0}$ was 35.6 (g/g).

Then, two samples whose $CRC_{r0}$ had been measured were each immersed in an aqueous solution which had been obtained by dissolving 0.46 g (2.3 mmol) of magnesium chloride hexahydrate in 80 g of deionized water, and stirring was carried out at 20° C. for 30 minutes. The water-absorbing resin was thus dehydrated, and a dehydrated water-absorbing resin was obtained. After 30 minutes had elapsed, the samples were pulled up and the CRC ($CRC_{t1}$) of the dehydrated water-absorbing resin was measured as in Example 2-1. The $CRC_{t1}$ was 3.1 (g/g). Meanwhile, the dehydration rate was 91.3%.

The water-absorbing resin was taken out from one of the samples whose $CRC_{t1}$ had been measured, and the solid content concentration of this water-absorbing resin was measured. The solid content concentration thus measured was 22.4 mass %.

Then, the other one of the samples whose $CRC_{t1}$ had been measured was immersed in an aqueous solution which had been obtained by dissolving 0.84 g (2.3 mmol) of sodium tripolyphosphate in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{t2}$) of the regenerated water-absorbing resin after drying was measured. The $CRC_{t2}$ was 35.8 (g/g). Meanwhile, the water-absorbing power recovery rate was 100.6%.

Example 2-8

The CRC ($CRC_{r0}$) of the initial water-absorbing resin was measured as in Example 2-1. The $CRC_{r0}$ was 35.6 (g/g).

Then, two samples whose $CRC_{r0}$ had been measured were each immersed in an aqueous solution which had been obtained by dissolving 0.79 g (2.3 mmol) of aluminum sulfate in 80 g of deionized water, and stirring was carried out at 20° C. for 30 minutes. The water-absorbing resin was thus dehydrated, and a dehydrated water-absorbing resin was obtained. After the 30 minutes had elapsed, the samples were pulled up and the CRC ($CRC_{t1}$) of the dehydrated water-absorbing resin was measured as in Example 2-1. The $CRC_{t1}$ was 6.5 (g/g). Meanwhile, the dehydration rate was 81.7%.

The water-absorbing resin was taken out from one of the samples whose $CRC_{t1}$ had been measured, and the solid content concentration of this water-absorbing resin was measured. The solid content concentration thus measured was 11.5 mass %.

Then, the other one of the samples whose $CRC_{t1}$ had been measured was immersed in an aqueous solution which had been obtained by dissolving 0.84 g (2.3 mmol) of sodium tripolyphosphate in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{t2}$) of the regenerated water-absorbing resin after drying was measured. The $CRC_{t2}$ was 35.5 (g/g). Meanwhile, the water-absorbing power recovery rate was 99.7%.

Example 2-9

The CRC ($CRC_{r0}$) of the initial water-absorbing resin was measured as in Example 2-1. The $CRC_{r0}$ was 34.9 (g/g).

Then, two samples whose $CRC_{r0}$ had been measured were each dehydrated by carrying out treatment as in Example 2-1, so that a dehydrated water-absorbing resin was obtained. After 30 minutes had elapsed, the samples were pulled up and the CRC ($CRC_{t1}$) of the dehydrated water-absorbing resin was measured as in Example 2-1. The $CRC_{t1}$ was 1.9 (g/g). Meanwhile, the dehydration rate was 94.6%.

The water-absorbing resin was taken out from one of the samples whose $CRC_{t1}$ had been measured, and the solid content concentration of this water-absorbing resin was measured. The solid content concentration thus measured was 28.9 mass %.

Then, the other one of the samples whose $CRC_{t1}$ had been measured was immersed in an aqueous solution which had been obtained by dissolving 0.21 g (0.57 mmol) of sodium tripolyphosphate in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{t2}$) of the regenerated water-absorbing resin after drying was measured. The $CRC_{t2}$ was 21.1 (g/g). Meanwhile, the water-absorbing power recovery rate was 60.5%.

Example 2-10

The CRC ($CRC_{r0}$) of the initial water-absorbing resin was measured as in Example 2-1. The $CRC_{r0}$ was 35.4 (g/g).

Then, two samples whose $CRC_{r0}$ had been measured were each dehydrated by carrying out treatment as in Example 2-1, so that a dehydrated water-absorbing resin was obtained. After 30 minutes had elapsed, the samples were pulled up and the CRC ($CRC_{t1}$) of the dehydrated water-absorbing resin was measured as in Example 2-1. The $CRC_{t1}$ was 2.2 (g/g). Meanwhile, the dehydration rate was 93.8%.

The water-absorbing resin was taken out from one of the samples whose $CRC_{t1}$ had been measured, and the solid content concentration of this water-absorbing resin was measured. The solid content concentration thus measured was 25.2 mass %.

Then, the other one of the samples whose $CRC_{t1}$ had been measured was immersed in an aqueous solution which had been obtained by dissolving 0.21 g (0.57 mmol) of sodium tripolyphosphate and 0.09 g (2.3 mmol) of sodium hydroxide in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{t2}$) of the regenerated water-absorbing resin after drying was measured. The $CRC_{t2}$ was 28.4 (g/g). Meanwhile, the water-absorbing power recovery rate was 80.2%.

Example 2-11

The CRC ($CRC_{r0}$) of the initial water-absorbing resin was measured as in Example 2-1. The $CRC_{r0}$ was 34.9 (g/g).

Then, two samples whose $CRC_{r0}$ had been measured were each dehydrated by carrying out treatment as in Example 2-1, so that a dehydrated water-absorbing resin was obtained. After 30 minutes had elapsed, the samples were pulled up and the CRC ($CRC_{t1}$) of the dehydrated water-absorbing resin was measured as in Example 2-1. The $CRC_{t1}$ was 2.2 (g/g). Meanwhile, the dehydration rate was 93.7%.

The water-absorbing resin was taken out from one of the samples whose $CRC_{t1}$ had been measured, and the solid content concentration of this water-absorbing resin was measured. The solid content concentration thus measured was 23.3 mass %.

Then, the other one of the samples whose $CRC_{t1}$ had been measured was immersed in an aqueous solution which had been obtained by dissolving 0.21 g (0.57 mmol) of sodium tripolyphosphate and 0.19 g (2.3 mmol) of sodium hydrogen carbonate in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{t2}$) of the regenerated water-absorbing resin after drying was measured. The $CRC_{r2}$ was 24.7 (g/g). Meanwhile, the water-absorbing power recovery rate was 70.8%.

Example 2-12

The CRC ($CRC_{r0}$) of the initial water-absorbing resin was measured as in Example 2-1. The $CRC_{r0}$ was 35.2 (g/g).

Then, two samples whose $CRC_{r0}$ had been measured were each dehydrated by carrying out treatment as in Example 2-1, so that a dehydrated water-absorbing resin was obtained. After 30 minutes had elapsed, the samples were pulled up and the CRC ($CRC_{r1}$) of the dehydrated water-absorbing resin was measured as in Example 2-1. The $CRC_{r1}$ was 2.4 (g/g). Meanwhile, the dehydration rate was 93.2%.

The water-absorbing resin was taken out from one of the samples whose $CRC_{r1}$ had been measured, and the solid content concentration of this water-absorbing resin was measured. The solid content concentration thus measured was 23.3 mass %.

Then, the other one of the samples whose $CRC_{r1}$ had been measured was immersed in an aqueous solution which had been obtained by dissolving 0.40 g (1.1 mmol) of a 3-hydroxy-2,2'-iminodisuccinic acid tetrasodium salt in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{r2}$) of the regenerated water-absorbing resin after drying was measured. The $CRC_{r2}$ was 24.8 (g/g). Meanwhile, the water-absorbing power recovery rate was 70.5%.

Example 2-13

The CRC ($CRC_{r0}$) of the initial water-absorbing resin was measured as in Example 2-1. The $CRC_{r0}$ was 35.2 (g/g).

Then, two samples whose $CRC_{r0}$ had been measured were each dehydrated by carrying out treatment as in Example 2-1, so that a dehydrated water-absorbing resin was obtained. After 30 minutes had elapsed, the samples were pulled up and the CRC ($CRC_{r1}$) of the dehydrated water-absorbing resin was measured as in Example 2-1. The $CRC_{r1}$ was 1.3 (g/g). Meanwhile, the dehydration rate was 96.3%.

The water-absorbing resin was taken out from one of the samples whose $CRC_{r1}$ had been measured, and the solid content concentration of this water-absorbing resin was measured. The solid content concentration thus measured was 31.9 mass %.

Then, the other one of the samples whose $CRC_{r1}$ had been measured was immersed in an aqueous solution which had been obtained by dissolving 0.40 g (1.1 mmol) of a 3-hydroxy-2,2'-iminodisuccinic acid tetrasodium salt and 0.09 g (2.3 mmol) of sodium hydroxide in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{r2}$) of the regenerated water-absorbing resin after drying was measured. The $CRC_{r2}$ was 35.4 (g/g). Meanwhile, the water-absorbing power recovery rate was 100.6%.

Example 2-14

The CRC ($CRC_{r0}$) of the initial water-absorbing; resin was measured as in Example 2-1. The $CRC_{r0}$ was 34.8 (g/g).

Then, two samples whose $CRC_{r0}$ had been measured were each dehydrated by carrying out treatment as in Example 2-1, so that a dehydrated water-absorbing resin was obtained. After 30 minutes had elapsed, the samples were pulled up and the CRC ($CRC_{r1}$) of the dehydrated water-absorbing resin was measured as in Example 2-1. The $CRC_{r1}$ was 2.0 (g/g). Meanwhile, the dehydration rate was 94.3%.

The water-absorbing resin was taken out from one of the samples whose $CRC_{r1}$ had been measured, and the solid content concentration of this water-absorbing resin was measured. The solid content concentration thus measured was 27.5 mass %.

Then, the other one of the samples whose $CRC_{r1}$ had been measured was immersed in an aqueous solution which had been obtained by dissolving 0.40 g (1.1 mmol) of a 3-hydroxy-2,2'-iminodisuccinic acid tetrasodium salt and 0.19 g (2.3 mmol) of sodium hydrogen carbonate in 80 g of deionized water, and stirring was carried out at 29° C. for 60 minutes. After the 60 minutes had elapsed, the sample was pulled up and dried in a reduced-pressure dryer at 70° C. for 24 hours. Then, the CRC ($CRC_{r2}$) of the regenerated water-absorbing resin after drying was measured. The $CRC_{r2}$ was 30.0 (g/g). Meanwhile, the water-absorbing power recovery rate was 86.2%.

Example 2-15

The CRC ($CRC_{r0}$) of the initial water-absorbing resin was measured as in Example 2-1. The $CRC_{r0}$ was 34.5 (g/g).

Then, two samples whose $CRC_{r0}$ had been measured were each immersed in an aqueous solution which had been obtained by dissolving 0.17 g (1.2 mmol) of calcium chloride dihydrate in 80 g of deionized water, and stirring was carried out at 20° C. for 30 minutes. The water-absorbing resin was thus dehydrated, and a dehydrated water-absorbing resin was obtained. After the 30 minutes had elapsed, the samples were pulled up and the CRC ($CRC_{r1}$) of the dehydrated water-absorbing resin was measured as in Example 2-1. The $CRC_{r1}$ was 4.4 (g/g) Meanwhile, the dehydration rate was 87.2%.

The water-absorbing resin was taken out from one of the samples whose $CRC_{r1}$ had been measured, and the solid content concentration of this water-absorbing resin was measured. The solid content concentration thus measured was 13.7 mass %.

Then, the other one of the samples whose $CRC_{r1}$ had been measured was immersed in an aqueous solution which had been obtained by dissolving 0.42 g (1.1 mmol) of sodium tripolyphosphate in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{r2}$) of the regenerated water-absorbing resin after drying was measured. The $CRC_{r2}$ was 30.3 (g/g). Meanwhile, the water-absorbing power recovery rate was 87.8%.

Comparative Example 2-1

The CRC ($CRC_{r0}$) of the initial water-absorbing resin was measured as in Example 2-1. The $CRC_{r0}$ was 34.6 (g/g).

Then, two samples whose $CRC_{r0}$ had been measured were each dehydrated by carrying out treatment as in Example 2-1, so that a dehydrated water-absorbing resin was obtained. After 30 minutes had elapsed, the samples were pulled up and the CRC ($CRC_{r1}$) of the dehydrated water-absorbing resin was measured as in Example 2-1. The $CRC_{r1}$ was 2.4 (g/g). Meanwhile, the dehydration rate was 93.1%.

The water-absorbing resin was taken out from one of the samples whose $CRC_{r1}$ had been measured, and the solid content concentration of this water-absorbing resin was measured. The solid content concentration thus measured was 23.3 mass %.

Then, the other one of the samples whose $CRC_{t1}$ had been measured was immersed in an aqueous solution which had been obtained by dissolving 0.18 g (4.5 mmol) of sodium hydroxide in 80 g of deionized water, and stirring was carried out at 20° C. for 60 minutes. After the 60 minutes had elapsed, the sample was pulled up and dried in reduced-pressure dryer at 70° C. for 24 hours. Then, the CRC ($CRC_{t2}$) of the regenerated water-absorbing resin after drying was measured. The $CRC_{t2}$ was 8.7 (g/g). Meanwhile, the water-absorbing power recovery rate was 25.1%.

Comparative Example 2-2

The CRC ($CRC_{r0}$) of the initial water-absorbing resin was measured as in Example 2-1. The $CRC_{r0}$ was 34.4 (g/g).

Then, two samples whose $CRC_{r0}$ had been measured were each dehydrated by carrying out treatment as in Example 2-1, so that a dehydrated water-absorbing resin was obtained. After 30 minutes had elapsed, the samples were pulled up and the CRC ($CRC_{t1}$) of the dehydrated water-absorbing resin was measured as in Example 2-1. The $CRC_{t1}$ was 2.4 (g/g). Meanwhile, the dehydration rate was 93.0%.

The water-absorbing resin was taken out from one of the samples whose $CRC_{t1}$ had been measured, and the solid content concentration of this water-absorbing resin was measured. The solid content concentration thus measured was 23.3 mass %.

Then, the other one of the samples whose $CRC_{t1}$ had been measured was immersed in an aqueous solution which had been obtained by dissolving 0.37 g (9.3 mmol) of sodium hydroxide in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{t2}$) of the regenerated water-absorbing resin after drying was measured. The $CRC_{t2}$ was 8.2 (g/g). Meanwhile, the water-absorbing power recovery rate was 23.8%.

Comparative Example 2-3

The CRC ($CRC_{r0}$) of the initial water-absorbing resin was measured as in Example 2-1. The $CRC_{r0}$ was 34.7 (g/g).

Then, two samples whose $CRC_{r0}$ had been measured were each dehydrated by carrying out treatment as in Example 2-1, so that a dehydrated water-absorbing resin was obtained. After 30 minutes had elapsed, the samples were pulled up and the CRC ($CRC_{t1}$) of the dehydrated water-absorbing resin was measured as in Example 2-1. The $CRC_{t1}$ was 1.9 (g/g). Meanwhile, the dehydration rate was 94.6%.

The water-absorbing resin was taken out from one of the samples whose $CRC_{t1}$ had been measured, and the solid content concentration of this water-absorbing resin was measured. The solid content concentration thus measured was 29.5 mass %.

Then, the other one of the samples whose $CRC_{t1}$ had been measured was immersed in an aqueous solution which had been obtained by dissolving 0.53 g (9.1 mmol) of sodium chloride in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{t2}$) of the regenerated water-absorbing resin after drying was measured. The $CRC_{t2}$ was 2.0 (g/g). Meanwhile, the water-absorbing power recovery rate was 5.9%.

Comparative Example 2-4

The CRC ($CRC_{r0}$) of the initial water-absorbing resin was measured as in Example 2-1. The $CRC_{r0}$ was 35.4 (g/g).

Then, two samples whose $CRC_{r0}$ had been measured were each dehydrated by carrying out treatment as in Example 2-1, so that a dehydrated water-absorbing resin was obtained. After 30 minutes had elapsed, the samples were pulled up and the CRC ($CRC_{t1}$) of the dehydrated water-absorbing resin was measured as in Example 2-1. The $CRC_{t1}$ was 2.1 (g/g). Meanwhile, the dehydration rate was 94.0%.

The water-absorbing resin was taken out from one of the samples whose $CRC_{t1}$ had been measured, and the solid content concentration of this water-absorbing resin was measured. The solid content concentration thus measured was 26.0 mass %.

Then, the other one of the samples whose $CRC_{t1}$ had been measured was immersed in an aqueous solution which had been obtained by dissolving 0.53 g (6.3 mmol) of sodium hydrogen carbonate in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{t2}$) of the regenerated water-absorbing resin after drying was measured. The $CRC_{t2}$ was 1.3 (g/g). Meanwhile, the water-absorbing power recovery rate was 3.7%.

Comparative Example 2-5

The CRC ($CRC_{r0}$) of the initial water-absorbing resin was measured as in Example 2-1. The $CRC_{r0}$ was 35.2 (g/g).

Then, two samples whose $CRC_{r0}$ had been measured were each dehydrated by carrying out treatment as in Example 2-1, so that a dehydrated water-absorbing resin was obtained. After 30 minutes had elapsed, the samples were pulled up and the CRC ($CRC_{t1}$) of the dehydrated water-absorbing resin was measured as in Example 2-1. The $CRC_{t1}$ was 2.1 (g/g). Meanwhile, the dehydration rate was 94.0%.

The water-absorbing resin was taken out from one of the samples whose $CRC_{t1}$ had been measured, and the solid content concentration of this water-absorbing resin was measured. The solid content concentration thus measured was 26.3 mass %.

Then, the other one of the samples whose $CRC_{t1}$ had been measured was immersed in an aqueous solution which had been obtained by dissolving 0.38 g (4.6 mmol) of sodium acetate in 80 g of deionized water, and stirring was carried out at 20° C. for 60 minutes. After the 60 minutes had elapsed, the sample was pulled up and dried in a reduced-pressure dryer at 70° C. for 24 hours. Then, the CRC ($CRC_{t2}$) of the regenerated water-absorbing resin after drying was measured. The $CRC_{t2}$ was 2.1 (g/g). Meanwhile, the water-absorbing power recovery rate was 6.0%.

Table 3 below shows compounds used and an amount of the compounds used in the dehydration step and the regeneration step of Examples 2-1 to 2-15 and Comparative Examples 2-1 to 2-5. Further, Table 4 below shows results of measurements of the CRC, the dehydration rate and the water-absorbing power recovery rate.

TABLE 3

| | Dehydration step | | Regeneration step | |
|---|---|---|---|---|
| | Type | Amount used (mmol/gram of water-absorbing resin) | Type | Amount used (mmol/gram of dehydrated water-absorbing resin) |
| Example 2-1 | CaCl$_2$•2H$_2$O | 11.5 | citric acid 3Na | 11.4 |
| Example 2-2 | CaCl$_2$•2H$_2$O | 11.5 | HIDS•4Na | 11.3 |
| Example 2-3 | CaCl$_2$•2H$_2$O | 11.5 | Na pyrophosphate | 11.4 |
| Example 2-4 | CaCl$_2$•2H$_2$O | 11.5 | DTPA•3Na | 22.9 |
| Example 2-5 | CaCl$_2$•2H$_2$O | 11.5 | iminodiacetic acid Na•H$_2$O | 22.8 |
| Example 2-6 | CaCl$_2$•2H$_2$O | 11.5 | Na tripolyphosphate | 11.4 |
| Example 2-7 | MgCl$_2$•6H$_2$O | 11.5 | Na tripolyphosphate | 11.4 |
| Example 2-8 | aluminum sulfate | 11.5 | Na tripolyphosphate | 11.4 |
| Example 2-9 | CaCl$_2$•2H$_2$O | 11.5 | Na tripolyphosphate | 2.9 |
| Example 2-10 | CaCl$_2$•2H$_2$O | 11.5 | Na tripolyphosphate NaOH | 2.9 11.3 |
| Example 2-11 | CaCl$_2$•2H$_2$O | 11.5 | Na tripolyphosphate NaHCO$_3$ | 2.9 11.3 |
| Example 2-12 | CaCl$_2$•2H$_2$O | 11.5 | HIDS•4Na | 5.7 |
| Example 2-13 | CaCl$_2$•2H$_2$O | 11.5 | HIDS•4Na NaOH | 5.7 11.3 |
| Example 2-14 | CaCl$_2$•2H$_2$O | 11.5 | HIDS•4Na NaHCO$_3$ | 5.7 11.3 |
| Example 2-15 | CaCl$_2$•2H$_2$O | 5.8 | Na tripolyphosphate | 5.7 |
| Comparative Example 2-1 | CaCl$_2$•2H$_2$O | 11.5 | NaOH | 22.5 |
| Comparative Example 2-2 | CaCl$_2$•2H$_2$O | 11.5 | NaOH | 46.3 |
| Comparative Example 2-3 | CaCl$_2$•2H$_2$O | 11.5 | NaCl | 45.3 |
| Comparative Example 2-4 | CaCl$_2$•2H$_2$O | 11.5 | NaHCO$_3$ | 31.5 |
| Comparative Example 2-5 | CaCl$_2$•2H$_2$O | 11.5 | Na acetate | 23.2 |

Respective abbreviations in Table 3 denote the following compounds.

CaCl$_2$·2H$_2$O: calcium chloride dihydrate

MgCl$_2$·6H$_2$O: magnesium chloride hexahydrate citric acid 3Na: citric acid trisodium salt HIDS·4Na: 3-hydroxy-2,2'-iminodisuccinic acid tetrasodium salt Na pyrophosphate: sodium pyrophosphate DTPA·3Na: diethylenetriamine pentaacetic acid trisodium salt iminodiacetic acid Na·H$_2$O: iminodiacetic acid sodium salt monohydarate Na tripolyphosphate: sodium tripolyphosphate NaOH: sodium hydroxide NaHCO$_3$: sodium hydrogen carbonate NaCl: sodium chloride Na acetate: sodium acetate.

TABLE 4

| | | | | After dehydration step | | After regeneration step |
|---|---|---|---|---|---|---|
| | CRC | | | Dehydration rate | Solid content concentration | Water-absorbing power recovery rate |
| | CRC$_{r0}$ | CRC$_{r1}$ | CRC$_{r2}$ | (%) | (mass %) | (%) |
| Example 2-1 | 34.8 | 2.3 | 14.5 | 93.4 | 24.2 | 41.7 |
| Example 2-2 | 34.9 | 2.3 | 34.2 | 93.4 | 25.3 | 98.0 |
| Example 2-3 | 34.9 | 2.4 | 30.0 | 93.2 | 23.5 | 85.8 |
| Example 2-4 | 34.8 | 2.2 | 31.6 | 93.7 | 25.6 | 90.8 |
| Example 2-5 | 34.4 | 2.6 | 26.1 | 92.5 | 21.9 | 76.0 |
| Example 2-6 | 33.8 | 2.3 | 33.6 | 93.2 | 24.2 | 99.4 |
| Example 2-7 | 35.6 | 3.1 | 35.8 | 91.3 | 22.4 | 100.6 |
| Example 2-8 | 35.6 | 6.5 | 35.5 | 81.7 | 11.5 | 99.7 |
| Example 2-9 | 34.9 | 1.9 | 21.1 | 94.6 | 28.9 | 60.5 |
| Example 2-10 | 35.4 | 2.2 | 28.4 | 93.8 | 25.2 | 80.2 |
| Example 2-11 | 34.9 | 2.2 | 24.7 | 93.7 | 23.3 | 70.8 |
| Example 2-12 | 35.2 | 2.4 | 24.8 | 93.2 | 23.3 | 70.5 |
| Example 2-13 | 35.2 | 1.3 | 35.4 | 96.3 | 31.9 | 100.6 |
| Example 2-14 | 34.8 | 2.0 | 30.0 | 94.3 | 27.5 | 86.2 |
| Example 2-15 | 34.5 | 4.4 | 30.3 | 87.2 | 13.7 | 87.8 |
| Comparative Example 2-1 | 34.6 | 2.4 | 8.7 | 93.1 | 23.3 | 25.1 |

TABLE 4-continued

| | CRC | | | After dehydration step | | After regeneration step |
| | | | | Dehydration rate | Solid content concentration | Water-absorbing power recovery rate |
| | $CRC_{r0}$ | $CRC_{r1}$ | $CRC_{r2}$ | (%) | (mass %) | (%) |
|---|---|---|---|---|---|---|
| Comparative Example 2-2 | 34.4 | 2.4 | 8.2 | 93.0 | 23.3 | 23.8 |
| Comparative Example 2-3 | 34.7 | 1.9 | 2.0 | 94.6 | 29.5 | 5.9 |
| Comparative Example 2-4 | 35.4 | 2.1 | 1.3 | 94.0 | 26.0 | 3.7 |
| Comparative Example 2-5 | 35.2 | 2.1 | 2.1 | 94.0 | 26.3 | 6.0 |

As shown in FIGS. 3 and 4, in Examples 2-1 to 2-15, a polyvalent metal salt was used in the dehydration step. This makes it possible to obtain a dehydrated water-absorbing resin which has a high dehydration rate of more than 80%. Further, in the regeneration step, a complex forming compound was used. The complex forming compound forms a complex with metal which is contained in the polyvalent metal salt. Use of the complex forming compound made it possible to obtain a regenerated water-absorbing resin which has a high water-absorbing power recovery rate of more than 40%. Further, in Examples 2-10, 2-11, 2-13, and 2-14, it was possible to further increase the water-absorbing power recovery rate of the regenerated water-absorbing resin by using an alkali metal salt together with the complex forming compound in the regeneration step.

In contrast, in Comparative Examples 2-1 to 2-5 in which an alkali metal salt was used alone in the regeneration step, the water-absorbing power did riot recover sufficiently and the water-absorbing power recovery rate had a value of only less than 30%.

INDUSTRIAL APPLICABILITY

A recycling method in accordance with an aspect of the first embodiment of the present invention makes it possible to obtain a regenerated water-absorbing resin, which has a high dehydration rate and which is excellent in water-absorbing property, from a used absorbent article in a smaller number of steps than that a conventional art. Further, a recycling method in accordance with an aspect of the second embodiment of the present invention makes it possible to obtain, at high productivity, a regenerated water-absorbing resin which has a high dehydration rate and which is excellent in water-absorbing property. Therefore, the recycling method in accordance with each of these aspects of the present invention can be suitably applied to, for example, a recycling field for recycling water-absorbing resins from hygienic materials (sanitary materials) such as paper diapers, sanitary napkins, incontinence products for adults (incontinence pads), and sheets for pets.

The invention claimed is:

1. A method for recycling a water-absorbing resin contained in a used absorbent article, wherein the water-absorbing resin contains an absorbed liquid, the method comprising:
    (i) an immersion step of immersing the used absorbent article in an immersion liquid containing a hydrophilic organic solvent, wherein the used absorbent article contains the water-absorbing resin that has taken in the absorbed liquid and wherein the hydrophilic organic solvent is an organic solvent which has a solubility of 20 g or more with respect to 100 mL of water at 20° C.;
    (ii) a crushing step of crushing the used absorbent article into a crushed material in the immersion step or prior to the immersion step; and
    (iii) a separation step of separating the water-absorbing resin from a mixture of the immersion liquid and the crushed material,
    wherein the hydrophilic organic solvent in the immersion liquid at a time when the immersion step is ended has a concentration of 40 mass % or more.

2. The method according to claim 1, wherein in said step (i), the immersion liquid contains 40 mass % or more of the hydrophilic organic solvent.

3. The method according to claim 1, wherein in said step (iii), at least one member selected from pulp, nonwoven fabric, and adhesive is further separated and collected.

4. The method according to claim 1, wherein in said step (iii), the hydrophilic organic solvent is further separated and collected.

5. The method according to claim 1, wherein the water-absorbing resin after said step (i) has a dehydration rate of 80% or more.

6. The method according to claim 5, wherein the water-absorbing resin after said step (i) has a water-absorbing power recovery rate of 90% or more.

7. The method according to claim 1, wherein the water-absorbing resin after the step (i) has a solid content concentration of 8 mass % or more.

\* \* \* \* \*